US009726869B2

(12) United States Patent
Yamaguchi et al.

(10) Patent No.: US 9,726,869 B2
(45) Date of Patent: Aug. 8, 2017

(54) VARIABLE MAGNIFICATION OPTICAL SYSTEM, OPTICAL DEVICE, AND PRODUCTION METHOD FOR VARIABLE MAGNIFICATION OPTICAL SYSTEM

(71) Applicant: NIKON CORPORATION, Tokyo (JP)

(72) Inventors: Satoshi Yamaguchi, Sagamihara (JP); Issei Tanaka, Yokohama (JP)

(73) Assignee: Nikon Corporation, Tokyo (JP)

( * ) Notice: Subject to any disclaimer, the term of this patent is extended or adjusted under 35 U.S.C. 154(b) by 78 days.

(21) Appl. No.: 14/616,718

(22) Filed: Feb. 8, 2015

(65) Prior Publication Data

US 2015/0153550 A1 Jun. 4, 2015

Related U.S. Application Data

(63) Continuation of application No. PCT/JP2013/071660, filed on Aug. 9, 2013.

(30) Foreign Application Priority Data

Aug. 9, 2012 (JP) .................. 2012-177143
Aug. 9, 2012 (JP) .................. 2012-177144
Aug. 9, 2012 (JP) .................. 2012-177145

(51) Int. Cl.
*G02B 15/173* (2006.01)
*G02B 27/64* (2006.01)
*G02B 1/11* (2015.01)

(52) U.S. Cl.
CPC .............. *G02B 15/173* (2013.01); *G02B 1/11* (2013.01); *G02B 27/646* (2013.01)

(58) Field of Classification Search
CPC ........ G02B 15/00; G02B 15/14; G02B 15/15; G02B 15/155; G02B 15/161;
(Continued)

(56) References Cited

U.S. PATENT DOCUMENTS 5,477,297 A 12/1995 Suzuki
5,654,826 A 8/1997 Suzuki
(Continued)

FOREIGN PATENT DOCUMENTS

JP 7-92431 A 4/1995
JP 8-278445 A 10/1996
(Continued)

OTHER PUBLICATIONS

English Translation of International Preliminary Report on Patentability from International Patent Application No. PCT/JP2013/071660, Feb. 19, 2015.
(Continued)

*Primary Examiner* — Scott J Sugarman
*Assistant Examiner* — Ibrahima Diedhiou
(74) *Attorney, Agent, or Firm* — Shapiro, Gabor and Rosenberger, PLLC

(57) ABSTRACT

Comprising, in order from an object side: a first lens group G1 having positive refractive power; a second lens group G2 having negative refractive power; a third lens group G3 having positive refractive power; and a fourth lens group G4 having positive refractive power; upon zooming from a wide-angle end state to a telephoto end state, the first lens group G1 being fixed in the position in the direction of the optical axis, at least the second lens group G2 and the third lens group G3 being moved in the direction of the optical axis such that a distance between the first lens group G1 and the second lens group G2 is increased and a distance between the second lens group G2 and the third lens group G3 is decreased; and a predetermined conditional expression being satisfied, thereby providing a variable magnification optical system which can suppress variations in aberrations upon zooming and having excellent optical performance from a wide angle end state to a telephoto end state, an
(Continued)

optical apparatus, and a method for manufacturing a variable magnification optical system.

42 Claims, 20 Drawing Sheets

(58) Field of Classification Search
CPC .. G02B 15/163; G02B 15/167; G02B 15/173; G02B 15/20; G02B 15/22; G02B 1/11; G02B 1/111; G02B 1/113; G02B 1/115; G02B 27/0018; G02B 27/64; G02B 27/646; G02B 5/1814; G02B 13/00; G02B 13/009; Y10T 29/4984; G03B 5/00; H04N 5/23248; H04N 5/23264; C03C 2217/475
USPC ....... 359/554, 557, 581, 601, 676, 677, 683, 359/684, 685, 687, 690, 694, 695, 740, 359/813; 396/55, 72, 79; 29/434; 348/E5.046
See application file for complete search history.

(56) References Cited

U.S. PATENT DOCUMENTS

| | | | |
|---|---|---|---|
| 6,891,680 B2 | 5/2005 | Sato | |
| 7,142,370 B2 | 11/2006 | Sato | |
| 8,405,906 B2 | 3/2013 | Mizuguchi et al. | |
| 8,441,739 B2 | 5/2013 | Yamaguchi | |
| 8,531,767 B2 | 9/2013 | Li | |
| 8,721,094 B2 | 5/2014 | Tanaka et al. | |
| 2004/0070844 A1 | 4/2004 | Sato | |
| 2005/0157403 A1 | 7/2005 | Sato | |
| 2008/0002259 A1 | 1/2008 | Ishizawa et al. | |
| 2009/0086321 A1 | 4/2009 | Mizuguchi et al. | |
| 2011/0122497 A1 | 5/2011 | Ishizawa et al. | |
| 2011/0128630 A1 | 6/2011 | Tanaka et al. | |
| 2011/0228407 A1 | 9/2011 | Yamaguchi | |
| 2012/0058261 A1 | 3/2012 | Ishizawa et al. | |
| 2012/0062993 A1 | 3/2012 | Li | |
| 2012/0113527 A1 | 5/2012 | Horiuchi | |
| 2012/0194918 A1 | 8/2012 | Yamaguchi | |

FOREIGN PATENT DOCUMENTS

| | | |
|---|---|---|
| JP | 2000-284174 A | 10/2000 |
| JP | 2000-356704 A | 12/2000 |
| JP | 2004-145304 A | 5/2004 |
| JP | 2008-070450 A | 3/2008 |
| JP | 2009-156893 A | 7/2009 |
| JP | 2009-192996 A | 8/2009 |
| JP | 2011-099964 A | 5/2011 |
| JP | 2011-113052 A | 6/2011 |
| JP | 2011-197302 A | 10/2011 |
| JP | 2012-058620 A | 3/2012 |
| JP | 2012-118097 A | 6/2012 |
| WO | WO 2006/030848 A1 | 3/2006 |

OTHER PUBLICATIONS

International Search Report from International Patent Application No. PCT/JP2013/071660, Nov. 19, 2013.
Extended European search report for European Patent Application No. 13827812.2, Sep. 2, 2016.

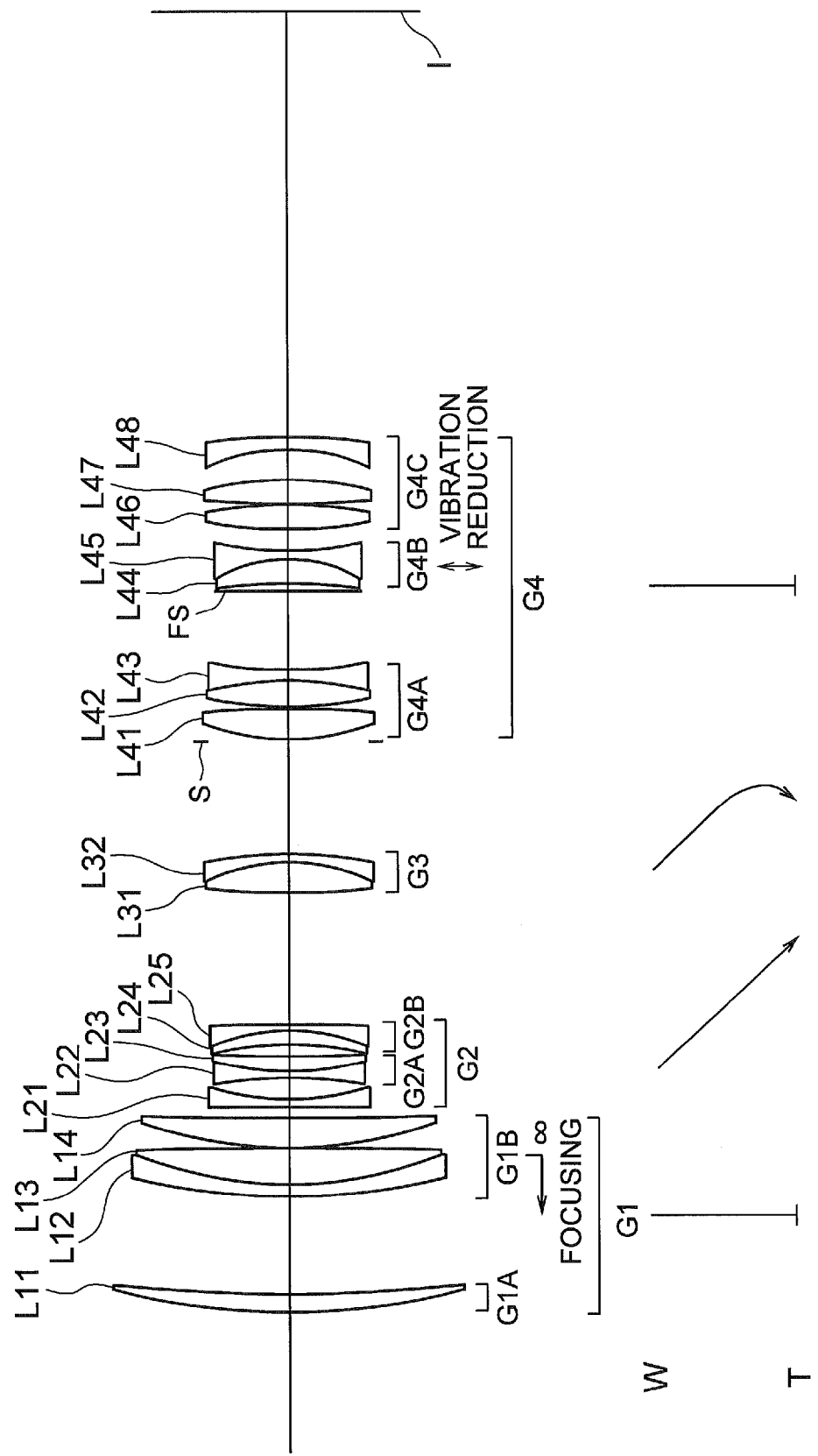

VARIABLE MAGNIFICATION OPTICAL SYSTEM, OPTICAL DEVICE, AND PRODUCTION METHOD FOR VARIABLE MAGNIFICATION OPTICAL SYSTEM

TECHNICAL FIELD

The present invention relates to a variable magnification optical system, an optical device, and a production method for the variable magnification optical system.

BACKGROUND ART

There has been proposed a variable magnification optical system suitable for a photographing camera, an electronic still camera, a video camera or the like, for example, in Japanese Patent application Laid-Open Gazette No. 2008-70450.

PRIOR ART REFERENCE

Patent Document

Patent Document 1: Japanese Patent application Laid-Open Gazette No. 2008-70450

SUMMARY OF THE INVENTION

Problems to be Solved by the Invention

However, in the conventional variable magnification optical system as described above, there was a problem that excellent optical performance could not have been realized.

The present invention is made in view of the above-described problem, and has an object to provide a variable magnification optical system capable of realizing excellent optical performance from a wide angle end state to a telephoto end state, an optical apparatus, and a method for manufacturing the variable magnification optical system.

In order to solve the above-mentioned object, according to a first aspect of the present invention, there is provided a variable magnification optical system comprising, in order from an object side: a first lens group having positive refractive power; a second lens group having negative refractive power; a third lens group having positive refractive power; and a fourth lens group having positive refractive power;

upon zooming from a wide-angle end state to a telephoto end state, the first lens group being fixed in a position in the direction of the optical axis, at least the second lens group and the third lens group being moved in the direction of the optical axis such that a distance between the first lens group and the second lens group is increased and a distance between the second lens group and the third lens group is decreased;

at least a portion of the first to the fourth lens groups being so moved to have a component in a direction perpendicular to the optical axis; and the following conditional expression being satisfied:

$$-1.20 < fw^2/(f13w \times f4) < -0.20$$

where $f13w$ denotes a composite focal length of the first lens group to the third lens group in the wide angle end state, f4 denotes a focal length of the fourth lens group, and fw denotes a focal length of the variable magnification optical system in the wide angle end state.

Further, according to a second aspect of the present invention, there is provided an optical apparatus equipped with the variable magnification optical system according to the first aspect of the present invention.

Further, according to a third aspect of the present invention, there is provided a variable magnification optical system comprising, in order from an object side: a first lens group having positive refractive power; a second lens group having negative refractive power; a third lens group having positive refractive power; and a fourth lens group having positive refractive power;

upon zooming from a wide-angle end state to a telephoto end state, the first lens group being fixed in a position in the direction of the optical axis, at least the second lens group and the third lens group being moved in the direction of the optical axis such that a distance between the first lens group and the second lens group is increased and a distance between the second lens group and the third lens group is decreased;

the fourth lens group comprising, in order from the object side, a first segment lens group having positive refractive power, a second segment lens group having negative refractive power and a third segment lens group having positive refractive power; and at least a portion of the second lens group being so moved to have a component in a direction perpendicular to the optical axis; and the following conditional expressions being satisfied:

$$-1.60 < f4B/f4C < -0.50$$

$$-1.60 < f4/f4B < -0.60$$

where f4 denotes a focal length of the fourth lens group, f4B denotes a focal length of the second segment lens group, and f4C denotes a focal length of the third segment lens group.

Further, according to a fourth aspect of the present invention, there is provided an optical apparatus equipped with the variable magnification optical system according to the third aspect of the present invention.

Further, according to a fifth aspect of the present invention, there is provided a method for manufacturing a variable magnification optical system comprising, in order from an object side: a first lens group having positive refractive power; a second lens group having negative refractive power; a third lens group having positive refractive power; and a fourth lens group having positive refractive power;

the method comprising the steps of:

constructing the first lens group to the fourth lens groups to satisfy the following conditional expression:

$$-1.20 < fw^2/(f13w \times f4) < -0.20$$

where $f13w$ denotes a composite focal length of the first lens group to the third lens group in the wide angle end state, f4 denotes a focal length of the fourth lens group, and fw denotes a focal length of the variable magnification optical system in the wide angle end state;

constructing at least the second lens group and the third lens group to be moved in a direction of the optical axis such that, upon zooming from a wide-angle end state to a telephoto end state, the first lens group is fixed in a position in the direction of the optical axis, a distance between the first lens group and the second lens group is increased and a distance between the second lens group and the third lens group is decreased; and constructing at least a portion of the first lens group to the fourth lens group to be moved to have a component in a direction perpendicular to the optical axis.

Further, according to a sixth aspect of the present invention, there is provided a method for manufacturing a variable magnification optical system comprising, in order from an object side: a first lens group having positive refractive power; a second lens group having negative refractive power; a third lens group having positive refractive power; and a fourth lens group having positive refractive power;

the method comprising the steps of:

constructing the fourth lens group to comprise, in order from the object side, a first segment lens group having positive refractive power, a second segment lens group having negative refractive power and a third segment lens group having positive refractive power;

constructing the fourth lens group to satisfy the following conditional expressions:

$-1.60 < f4B/f4C < -0.50$ $-1.60 < f4/f4B < -0.60$ where f4 denotes a focal length of the fourth lens group, f4B denotes a focal length of the second segment lens group, and f4C denotes a focal length of the third segment lens group;

constructing at least the second lens group and the third lens group to be movable in the direction of the optical axis such that, upon zooming from a wide-angle end state to a telephoto end state, the first lens group is fixed in a position in the direction of the optical axis, a distance between the first lens group and the second lens group is increased and a distance between the second lens group and the third lens group is decreased; and constructing at least a portion of the second lens group to be moved to have a component in a direction perpendicular to the optical axis.

Effect of the Invention

According to the first, second and fifth aspects of the present invention, there are provided a variable magnification optical system which is capable of suppressing variations in aberrations upon zooming and having excellent optical performance from a wide angle end state to a telephoto end state, an optical apparatus, and a method for manufacturing a variable magnification optical system.

According to the third, fourth and sixth aspects of the present invention, there are provided a variable magnification optical system which is capable of suppressing deterioration in optical performance upon conducting vibration reduction, and having excellent optical performance from a wide angle end state to a telephoto end state, an optical apparatus, and a method for manufacturing a variable magnification optical system.

BRIEF DESCRIPTION OF THE DRAWINGS

FIGS. 2A, 2B and 2C are graphs showing various aberrations of the variable magnification optical system according to the First Example of the present application upon focusing on an infinite distance object, in which FIG. 2A shows various aberrations in a wide-angle end state, FIG. 2B shows various aberrations in an intermediate focal length state, and FIG. 2C shows various aberrations in a telephoto end state.

FIGS. 3A and 3B are graphs showing meridional transverse aberration of the variable magnification optical system according to the First Example of the present application upon focusing on an infinitely distant object and conducting vibration reduction, in which FIG. 3A shows meridional transverse aberration in a wide-angle end state, and FIG. 3B shows meridional transverse aberration in a telephoto end state.

FIG. 4 is a sectional view showing a variable magnification optical system according to the Second Example that is common to a first to third embodiments of the present application.

FIGS. 5A, 5B and 5C are graphs showing various aberrations of the variable magnification optical system according to the Second Example of the present application upon focusing on an infinitely distant object, in which FIG. 5A shows various aberrations in a wide-angle end state, FIG. 5B shows various aberrations in an intermediate focal length state, and FIG. 5C shows various aberrations in a telephoto end state.

FIGS. 6A and 6B are graphs showing meridional transverse aberration of the variable magnification optical system according to the Second Example of the present application upon focusing on an infinitely distant object and conducting vibration reduction, in which FIG. 6A shows meridional transverse aberration in a wide-angle end state, and FIG. 6B shows meridional transverse aberration in a telephoto end state.

FIGS. 8A, 8B and 8C are graphs showing various aberrations of the variable magnification optical system according to the Third Example of the present application upon focusing on an infinitely distant object, in which FIG. 8A shows various aberrations in a wide-angle end state, FIG. 8B shows various aberrations in an intermediate focal length state, and FIG. 8C shows various aberrations in a telephoto end state.

FIGS. 9A and 9B are graphs showing meridional transverse aberration of the variable magnification optical system according to the Third Example of the present application upon focusing on an infinitely distant object and conducting vibration reduction, in which FIG. 9A shows meridional transverse aberration in a wide-angle end state, and FIG. 9B shows meridional transverse aberration in a telephoto end state.

EMBODIMENTS FOR CARRYING OUT THE INVENTION

Figure 1:
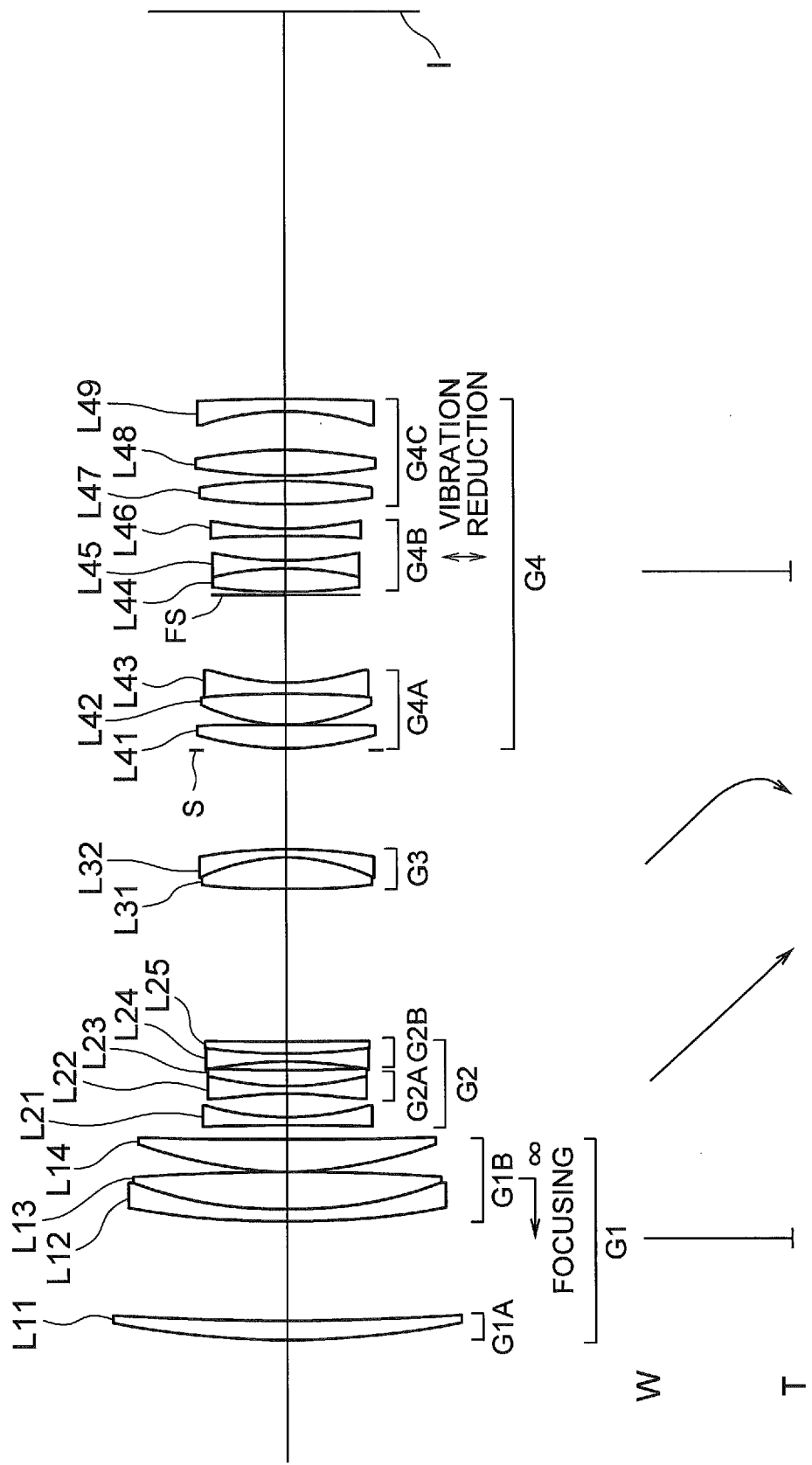
FIG. 1 is a sectional view showing a variable magnification optical system according to the First Example that is common to a first to third embodiments of the present application.

The variable magnification optical system, the optical apparatus and the method for manufacturing the variable magnification optical system according to the first embodiment of the present application is explained below.

The variable magnification optical system according to the first embodiment of the present application comprises, in order from an object side: a first lens group having positive refractive power; a second lens group having negative refractive power; a third lens group having positive refractive power; and a fourth lens group having positive refractive power;

upon zooming from a wide-angle end state to a telephoto end state, the first lens group being fixed in a position in the direction of the optical axis and at least the second lens group and the third lens group being moved in a direction of the optical axis such that a distance between the first lens group and the second lens group is increased and a distance between the second lens group and the third lens group is decreased;

at least a portion of the first to the fourth lens groups being so moved, as a vibration reduction lens group, to have a component in a direction perpendicular to the optical axis; and the following conditional expression (1) being satisfied:

$$-1.20 < fw^2/(f13w \times f4) < -0.20 \qquad (1)$$

where f13w denotes a composite focal length of the first lens group to the third lens group in the wide angle end state, f4 denotes a focal length of the fourth lens group, and fw denotes a focal length of the variable magnification optical system in the wide angle end state.

In the variable magnification optical system according to the first embodiment of the present application, at least a portion of the first to the fourth lens groups is so moved, as a vibration reduction lens group, to have a component in a direction perpendicular to the optical axis, so that an image position upon camera shake being caused is corrected, in other words, vibration reduction is conducted.

The conditional expression (1) defines a conjugate length and a magnification of the fourth lens group. The variable magnification optical system according to the first embodiment of the present application is capable of reducing the conjugate length of the fourth lens group as a socalled master lens, that is, a distance between the front imaging point and the rear imaging point thereof, by satisfying the conditional expression (1), thereby it becoming possible to make a space in which the first to third lens groups are movable for zooming larger. As a result, it is possible that, upon zooming, an amount of movement of the second lens group is increased, and an amount of variation in a distance between the second lens group and the third lens group is reduced. Therefore, while maintaining the whole length of the variable magnification optical system according to the first embodiment of the present application, variations in aberrations upon zooming can be made small.

In the variable magnification optical system according to the first embodiment of the present application, when the value of $fw^2/(f13w \times f4)$ is equal to or exceeds the upper limit of the conditional expression (1), refractive power of the fourth lens group becomes small and the amount of variation in the distance between the second lens group and the third lens group upon zooming increases. As a result, variations in various aberrations such as curvature of field as well as coma become excessive, and it becomes difficult to correct these aberrations in the intermediate focal length state. It is not desirable.

Meanwhile, in order to attain the advantageous effect of the present application more surely, it is preferable to set the upper limit value of the conditional expression (1) to −0.25.

On the other hand, in the variable magnification optical system according to the first embodiment of the present application, when the value of $fw^2/(f13w \times f4)$ is equal to or falls below the lower limit of the conditional expression (1), refractive power and magnification of the fourth lens group increase. Thus, spherical aberration and coma increase from the wide angle end state to the telephoto end state, and it becomes difficult to correct them so that it is not desirable.

Meanwhile, in order to attain the advantageous effect of the present application more surely, it is preferable to set the lower limit value of the conditional expression (1) to −0.60. Further, in order to attain the advantageous effect of the present application more surely, it is preferable to set the lower limit value of the conditional expression (1) to −0.45. Further, in order to attain the advantageous effect of the present application more surely, it is preferable to set the lower limit value of the conditional expression (1) to −0.35.

With configuring as described above, it is possible to realize a variable magnification optical system which can suppress variations in various aberrations upon zooming and has superb optical performance from the wide angle end state to the telephoto end state.

In the variable magnification optical system according to the first embodiment of the present application, it is preferable that the first lens group is composed of, in order from the object side, a front group having positive refractive power and a rear group having positive refractive power, and upon focusing from an infinitely distant object to a close distant object the rear group is moved toward the object side as the focusing lens group.

With configuring as above, in the variable magnification optical system according to the first embodiment of the present application, it is possible to decrease an outer diameter of the focusing lens group and reduce its weight. Accordingly, in the case where autofocussing is conducted by the variable magnification optical system according to the first embodiment of the present application, it is possible to reduce load of a motor for driving the focusing lens group. Further, while making larger magnification of the variable magnification optical system according to the first embodiment of the present application upon focusing on a close distant object, it is possible to suppress variation in aberration such as spherical aberration to be small upon focusing on the close distant object.

Further, in the variable magnification optical system according to the first embodiment of the present application, it is preferable that the most image side lens group in the variable magnification optical system has positive refractive power and is fixed in the position in the direction of the optical axis, upon zooming from the wide angle end state to the telephoto end state.

With such configuration, it is easy for the variable magnification optical system according to the first embodiment of the present application, to make an f-number upon zooming constant, so that it is possible to simplify a stop mechanism of an aperture stop disposed in the variable magnification optical system. Further, it is possible to reduce eccentricity or the like among the lens groups, so that deterioration in optical performance caused by manufacturing error such as the eccentricity, and concretely, eccentric coma and eccentric image plane inclination can be reduced.

Further, in the variable magnification optical system according to the first embodiment of the present application, it is preferable that magnification of the second lens group varies so as to stride across the equi-magnification and the following conditional expression (2) is satisfied:

$$0.30 < \beta 2w \times \beta 2t < 0.90 \quad (2)$$

Where $\beta 2w$ denotes magnification of the second lens group in the wide angle end state, and $\beta 2t$ denotes magnification of the second lens group in the telephoto end state.

In the variable magnification optical system according to the first embodiment of the present application, upon zooming from the wide angle state to the tele photo end state as described above, magnification of the second lens group changes so as to stride across the equi-magnification, that is to say, the magnification of the second lens group becomes −1 once on the way of zooming. By configuring as such, upon zooming, it is possible to make change in height of light rays through the second lens group small, so that variations in curvature of field and coma can be made small.

The conditional expression (2) defines a range of magnification of the second lens group. With satisfying the conditional expression (2), the variable magnification optical system according to the first embodiment of the present application can make variation in distance between the second lens group and the third lens group upon zooming small, and thereby deteriorations in coma and spherical aberration in the intermediate focal length state can be suppressed to be small.

In the variable magnification optical system according to the first embodiment of the present application, when the value of $\beta 2w \times \beta 2t$ is equal to or exceeds the upper limit value of the conditional expression (2), an amount of variation in the distance between the second lens group and the third lens group upon zooming increases, so that variations in various aberrations such as curvature of field and coma become excessive and it becomes difficult to correct these aberrations in the intermediate focal length state. Further, an amount of movement of the third lens group toward the object side upon zooming increases, and movement space for the second lens group becomes small. For this, it becomes difficult to correct curvature of field, spherical aberration and coma in the wide angle end state and in the telephoto end state, so that it is undesirable. Meanwhile, in order to attain the advantageous effect of the present application more surely, it is preferable to set the upper limit value of the conditional expression (2) to 0.80. Further, it is more preferable to set the upper limit value of the conditional expression (2) to 0.70.

On the other hand, in the variable magnification optical system according to the first embodiment of the present application, when the value of $\beta 2w \times \beta 2t$ is equal to or falls below the lower limit value of the conditional expression (2), the first lens group, the second lens group and the third lens group become too close to each other in the wide angle end state, so that it becomes difficult to correct coma and curvature of field. Further, focal length of the fourth lens group increases too much, and whole length and diameter of the variable magnification optical system according to the first embodiment of the present application become undesirably large. Meanwhile, in order to attain the advantageous effect of the present application more surely, it is preferable to set the lower limit value of the conditional expression (2) to 0.50.

In the variable magnification optical system according to the first embodiment of the present application, it is preferable that the following conditional expressions (3) and (4) are satisfied:

$$0.290 < N1n - N1p \quad (3)$$

$$0.160 < N3n - N3p \quad (4)$$

where $N1n$ denotes refractive index of a negative lens having the largest refractive index in the first lens group, $N1p$ denotes refractive index of a positive lens having the smallest refractive index in the first lens group, $N3n$ denotes refractive index of a negative lens having the largest refractive index in the third lens group, and $N3p$ denotes refractive index of a positive lens having the smallest refractive index in the third lens group.

The conditional expression (3) defines a difference in refractive index of the negative lens having the largest refractive index and refractive index of the positive lens having the smallest refractive index in the first lens group.

In the variable magnification optical system according to the first embodiment of the present application, with satisfying the conditional expression (3), it becomes possible to make curvature of each lens in the first lens group small, so that it becomes possible to correct coma excellently from the wide angle end state to the telephoto end state.

In the variable magnification optical system according to the first embodiment of the present application, when the value of $N1n - N1p$ is equal to or falls below the lower limit value of the conditional expression (3), it becomes difficult to correct coma from the wide angle end state to the telephoto end state. Further, variation in spherical aberration becomes large upon focusing on an infinitely distant object to a close distant object, so it is not preferable. Meanwhile, in order to attain the advantageous effect of the present application more surely, it is preferable to set the lower limit value of the conditional expression (3) to 0.350. Further, in order to attain the advantageous effect of the present application more surely, it is preferable to set the lower limit value of the conditional expression (3) to 0.400.

The conditional expression (4) defines a difference in refractive index of the negative lens having the largest refractive index and refractive index of the positive lens having the smallest refractive index in the third lens group.

In the variable magnification optical system according to the first embodiment of the present application, with satisfying the conditional expression (4), it becomes possible to make curvature of each lens in the third lens group small, so that coma can be excellently corrected from the wide angle end state to the telephoto end state.

In the variable magnification optical system according to the first embodiment of the present application, when the value of $N3n - N3p$ is equal to or falls below the lower limit value of the conditional expression (4), it becomes difficult to correct coma from the wide angle end state to the telephoto end state. Meanwhile, in order to attain the advantageous effect of the present application more surely, it is preferable to set the lower limit value of the conditional expression (4) to 0.180.

Further, in the variable magnification optical system according to the first embodiment of the present application, it is preferable that the fourth lens group is composed of, in order from the object side, a first segment lens group having positive refractive power, a second segment lens group having negative refractive power, and a third segment lens group having positive refractive power, and at least a portion of the second segment lens group is moved to have a component in a direction perpendicular to the optical axis, as a vibration reduction lens.

By adopting, as a vibration reduction lens, at least a portion of the lens group having negative refractive power of which height of light rays is low, it is possible to make diameter of the vibration reduction lens small. Further, if an aperture stop is disposed between the third lens group and the fourth lens group with adopting such configuration, the vibration reduction lens can be disposed in the neighborhood of an intermediate point between the aperture stop and the image plane, and accordingly it is possible to suppress variation in image height upon conducting vibration reduction to be small, and to suppress generation of eccentric coma to be small.

Further, in the variable magnification optical system according to the first embodiment of the present application, it is preferable that the second lens group comprises, in order from the object side, a negative lens, a first negative segment group having negative refractive power, and a second negative segment group having negative refractive power, and that the first negative segment group and the second negative segment group are respectively composed of a positive lens and a negative lens, that is, two lenses in total.

By adopting such configuration, angle of deviation of light rays at each lens surface in the second lens group in which variation in height of light rays is large upon zooming can be made small, so that variations in curvature of field and spherical aberration upon zooming and generation of coma can be suppressed to be small. Further, whole length of the variable magnification optical system according to the first embodiment of the present application can be reduced. Further, deterioration in optical performance due to manufacturing error such as eccentricity between lenses in the second lens group can be reduced, more concretely, eccentric coma and eccentric image plane inclination can be reduced.

In the variable magnification optical system according to the first embodiment of the present application, it is preferable that the front group of the first lens group is composed of a single lens having positive refractive power, and the rear group of the first lens group is composed of, in order from the object side, a negative lens, a positive lens and a positive lens.

By adopting such configuration, while the rear group that is the focusing lens group is made small in size and light in weight, variations in spherical aberration and curvature of field upon focusing can be suppressed to be small.

The optical apparatus of the present application is characterized in the provision of the variable magnification optical system according to the first embodiment having the above described configuration. By such configuration, it is possible to realize the optical apparatus which can suppress variations in aberrations upon zooming and has excellent optical performance from the wide angle end state to the telephoto end state.

The method for manufacturing the variable magnification optical system according to the first embodiment of the present application is a method for manufacturing a variable magnification optical system comprising, in order from an object side: a first lens group having positive refractive power; a second lens group having negative refractive power; a third lens group having positive refractive power; and a fourth lens group having positive refractive power;

the method comprising the steps of:

constructing the first lens group to the fourth lens group to satisfy the following conditional expression:

$$-1.20 < fw^2/(f13w \times f4) < -0.20$$

where $f13w$ denotes a composite focal length of the first lens group to the third lens group in the wide angle end state, $f4$ denotes a focal length of the fourth lens group, and $fw$ denotes a focal length of the variable magnification optical system in the wide angle end state; and constructing such that, upon zooming from a wide-angle end state to a telephoto end state, the first lens group is fixed in a position in the direction of the optical axis, and at least the second lens group and the third lens group are moved in a direction of the optical axis such that a distance between the first lens group and the second lens group is increased and a distance between the second lens group and the third lens group is decreased; and constructing at least a portion of the first to the fourth lens groups, as a vibration reduction lens group, to be moved to have a component in a direction perpendicular to the optical axis. Thus, it is possible to manufacture a variable magnification optical system which can suppress variations in aberrations upon zooming and has superb optical performance from the telephoto end state to the telephoto end state.

Next, the variable magnification optical system, the optical apparatus and the method for manufacturing the variable magnification optical system according to the second embodiment of the present application is explained below.

The variable magnification optical system according to the second embodiment of the present application comprises, in order from an object side: a first lens group having positive refractive power; a second lens group having negative refractive power; a third lens group having positive refractive power; and a fourth lens group having positive refractive power;

upon zooming from a wide-angle end state to a telephoto end state, the first lens group being fixed in a position in the direction of the optical axis, at least the second lens group and the third lens group being moved in the direction of the optical axis such that a distance between the first lens group and the second lens group is increased and a distance between the second lens group and the third lens group is decreased;

the fourth lens group comprising, in order from the object side, a first segment lens group having positive refractive power, a second segment lens group having negative refractive power and a third segment lens group having positive refractive power, at least a portion of the second segment lens group being moved, as a vibration reduction lens group, to have a component in a direction perpendicular to the optical axis; and the following conditional expressions (5) and (6) being satisfied:

$$-1.60 < f4B/f4C < -0.50 \quad (5)$$

$$-1.60 < f4/f4B < -0.60 \quad (6)$$

where f4 denotes a focal length of the fourth lens group, f4B denotes a focal length of the second segment lens group, and f4C denotes a focal length of the third segment lens group.

In the variable magnification optical system according to the second embodiment of the present application, at least a portion of the second segment lens group in the fourth lens group is moved, as a vibration reduction lens group, to have a component in a direction perpendicular to the optical axis, so that an image position upon camera shake being caused can be corrected, in other words, vibration reduction can be conducted.

Further, by adopting at least a portion of lens group in which height of light rays is low and which has negative refractive power as a vibration reduction lens group, outer diameter of the vibration reduction lens group can be made small. With such configuration, if an aperture stop is disposed in the third lens group and the fourth lens group, the vibration reduction lens group can be disposed in the neighborhood of the intermediate position between the aperture stop and the image plane. Accordingly, variation in height of light rays upon vibration reduction being conducted can be suppressed to be small, and generation of eccentric coma can be suppressed to be small.

The conditional expression (5) defines a ratio of refractive power between the second segment lens group and the third segment lens group in the fourth lens group. The conditional expression (6) defines a ratio of refractive power between the whole fourth lens group and the second segment lens group in the fourth lens group. With satisfying the conditional expressions (5) and (6), while the vibration reduction lens group being made small in size and in weight, it is possible to suppress variations in various aberrations upon conducting vibration reduction to be small.

In the variable magnification optical system according to the second embodiment of the present application, when the value of f4B/f4C is equal to or exceeds the upper limit value of the conditional expression (5), refractive power of the second segment lens group becomes excessively large, and curvature of field and coma become large. Further, variations in aberrations upon vibration reduction being conducted, in more concretely, socalled eccentric image plane inclination become large, so it is not desirable. Meanwhile, in order to attain the advantageous effect of the present application more surely, it is preferable to set the upper limit value of the conditional expression (5) to −0.70. Further, it is more preferable to set the upper limit value of the conditional expression (5) to −1.10.

On the other hand, in the variable magnification optical system according to the second embodiment of the present application, when the value of f4B/f4C is equal to or falls below the lower limit value of the conditional expression (5), refractive power of the second segment lens group becomes too small, and vibration reduction coefficient (ratio of movement amount of image on the image plane relative to movement amount of the vibration reduction lens upon vibration reduction being conducted) becomes small. Therefore, movement amount of the vibration reduction lens group upon vibration reduction being conducted for attaining a desired effect of vibration reduction becomes excessively large, so that it is not desirable. Further, variations in aberrations upon vibration reduction being conducted, in more concretely, socalled eccentric image plane inclination become large, so it is not desirable. Meanwhile, in order to attain the advantageous effect of the present application more surely, it is preferable to set the lower limit value of the conditional expression (5) to −1.30.

In the variable magnification optical system according to the second embodiment of the present application, when the value of f4/f4B is equal to or exceeds the upper limit of the conditional expression (6), respective refractive powers of the first to the third segment lens groups become too small, and outer diameter of the second segment lens group becomes too large. It is not desirable.

Meanwhile, in order to attain the advantageous effect of the present application more surely, it is preferable to set the upper limit value of the conditional expression (6) to −1.00. Further, it is more preferable to set the upper limit value of the conditional expression (6) to −1.20.

On the other hand, in the variable magnification optical system according to the second embodiment of the present application, when the value of f4/f4B is equal to or falls below the lower limit value of the conditional expression (6), respective refractive powers of the first to the third segment lens groups become too large, and variations in aberrations upon vibration reduction being conducted, in more concretely, eccentric image plane inclination become large, so it is not desirable. Further, deterioration in optical performance due to manufacturing error such as eccentricity between the lens groups, and particularly, eccentric coma and eccentric image plane inclination become excessively large, so that it is not desirable.

Meanwhile, in order to attain the advantageous effect of the present application more surely, it is preferable to set the lower limit value of the conditional expression (6) to −1.50. Further, in order to attain the advantageous effect of the present application more surely, it is preferable to set the lower limit value of the conditional expression (6) to −1.40

With configuration as described above, it is possible to realize the variable magnification optical system which can suppress deterioration in optical performance upon vibration reduction being conducted and which has excellent optical performance from the wide angle end state to the telephoto end state.

In the variable magnification optical system according to the second embodiment of the present application, it is desirable that the most image side lens group in the variable magnification optical system has positive refractive power and is fixed in a position in the direction of the optical axis upon zooming from the wide angle end state to the telephoto end state.

With such configuration, in the variable magnification optical system according to the second embodiment of the present application, it is easy to make an f-number upon zooming constant, and it becomes possible to simplify a stop mechanism of an aperture stop disposed in the variable magnification optical system. Further, deterioration in optical performance due to manufacturing error such as eccentricity between the lens groups, and particularly, eccentric coma and eccentric image plane inclination is reduced.

Further, in the variable magnification optical system according to the second embodiment of the present application, it is desirable that, upon zooming from the wide angle state to the telephoto end state, magnification of the second lens group varies so as to stride across the equi-magnification and the following conditional expression (2) is satisfied:

$$0.30 < \beta 2w \times \beta 2t < 0.90 \qquad (2)$$

where $\beta 2w$ denotes magnification of the second lens group in the wide angle end state, and $\beta 2t$ denotes magnification of the second lens group in the telephoto end state.

In the variable magnification optical system according to the second embodiment of the present application, upon zooming from the wide angle state to the telephoto end state as described above, magnification of the second lens group changes so as to stride across the equi-magnification, that is to say, the magnification of the second lens group becomes −1 once on the way of zooming. By configuring as such, upon zooming, it is possible to make change in height of light rays through the second lens group small, so that variations in curvature of field and coma is made small.

The conditional expression (2) defines a range of magnification of the second lens group. With satisfying the conditional expression (2), the variable magnification optical system according to the second embodiment of the present application can make variation in distance between the second lens group and the third lens group upon zooming small, and thereby deteriorations in coma and spherical aberration in the intermediate focal length state is suppressed to be small.

In the variable magnification optical system according to the second embodiment of the present application, when the value of β2w×β2t is equal to or exceeds the upper limit value of the conditional expression (2), an amount of variation in the distance between the second lens group and the third lens group upon zooming increases, so that variations in various aberrations such as curvature of field and coma become excessively large and it becomes difficult to correct these aberrations in the intermediate focal length state. Further, an amount of movement of the third lens group toward the object side upon zooming increases, and movement space for the second lens group becomes small. For this, it becomes difficult to correct curvature of field, spherical aberration and coma in the wide angle end state and in the telephoto end state, so that it is undesirable.

Meanwhile, in order to attain the advantageous effect of the present application more surely, it is preferable to set the upper limit value of the conditional expression (2) to 0.80. Further, it is more preferable to set the upper limit value of the conditional expression (2) to 0.70.

On the other hand, in the variable magnification optical system according to the second embodiment of the present application, when the value of β2w×β2t is equal to or falls below the lower limit value of the conditional expression (2), the first lens group, the second lens group and the third lens group become too close to each other in the wide angle end state, so that it becomes difficult to correct coma and curvature of field. Further, focal length of the fourth lens group increases too much, and whole length and outer diameter of the variable magnification optical system according to the second embodiment of the present application become large. It is undesirable.

Meanwhile, in order to attain the advantageous effect of the present application more surely, it is preferable to set the lower limit value of the conditional expression (2) to 0.50.

In the variable magnification optical system according to the second embodiment of the present application, it is preferable that the following conditional expressions (3) and (4) are satisfied:

$$0.290 < N1n - N1p \quad (3)$$

$$0.160 < N3n - N3p \quad (4)$$

where $N1n$ denotes refractive index of a negative lens having the largest refractive index in the first lens group, $N1p$ denotes refractive index of a positive lens having the smallest refractive index in the first lens group, $N3n$ denotes refractive index of a negative lens having the largest refractive index in the third lens group, and $N3p$ denotes refractive index of a positive lens having the smallest refractive index in the third lens group.

The conditional expression (3) defines a difference in refractive index of the negative lens having the largest refractive index and refractive index of the positive lens having the smallest refractive index in the first lens group.

In the variable magnification optical system according to the second embodiment of the present application, with satisfying the conditional expression (3), it becomes possible to make curvature of each lens in the first lens group small, so that it is possible to correct coma excellently from the wide angle end state to the telephoto end state.

In the variable magnification optical system according to the second embodiment of the present application, when the value of $N1n-N1p$ is equal to or falls below the lower limit value of the conditional expression (3), it becomes difficult to correct coma from the wide angle end state to the telephoto end state. Further, variation in spherical aberration becomes large upon focusing on an infinitely distant object to a close distant object, so it is not preferable.

Meanwhile, in order to attain the advantageous effect of the present application more surely, it is preferable to set the lower limit value of the conditional expression (3) to 0.350. Further, in order to attain the advantageous effect of the present application more surely, it is preferable to set the lower limit value of the conditional expression (3) to 0.400.

The conditional expression (4) defines a difference in refractive index of the negative lens having the largest refractive index and refractive index of the positive lens having the smallest refractive index in the third lens group.

In the variable magnification optical system according to the second embodiment of the present application, with satisfying conditional expression (4), it becomes possible to make curvature of each lens in the third lens group small, so that it is possible to correct coma excellently from the wide angle end state to the telephoto end state.

In the variable magnification optical system according to the second embodiment of the present application, when the value of $N3n-N3p$ is equal to or falls below the lower limit of the conditional expression (4) of the variable magnification optical system according to the second embodiment of the present application, it becomes difficult to correct coma from the wide angle end state to the telephoto end state.

Meanwhile, in order to attain the advantageous effect of the present application more surely, it is preferable to set the lower limit value of the conditional expression (4) to 0.180.

Further, in the variable magnification optical system according to the second embodiment of the present application, it is preferable that the second lens group comprises, in order from the object side, a negative lens, a first negative segment group having negative refractive power and a second negative segment group having negative refractive power, and the first negative segment group and the second negative segment group are respectively composed of a positive lens and a negative lens, that is, two lenses in total.

By adopting such configuration, angle of deviation of light rays at each lens surface in the second lens group in which variation in height of light rays is large upon zooming can be made small, so that it is possible to suppress variations in curvature of field and spherical aberration upon zooming and generation of coma to be small. Also, it is possible to make refractive index of the entire second lens group large, whole length of the variable magnification optical system according to the second embodiment of the present application can be reduced. Further, deterioration of optical performance due to manufacturing errors such as eccentricity between lenses in the second lens group can be reduced, more concretely, eccentric coma and eccentric image plane inclination can be reduced.

In the variable magnification optical system according to the second embodiment of the present application, it is preferable that the first lens group is composed of, in order from the object side, a front group having positive refractive power and a rear group having positive refractive power, and that upon focusing from an infinitely distant object to a close distant object the rear group is moved toward the object side as the focusing lens group.

By configuring as above, the variable magnification optical system according to the second embodiment of the present application, can decrease outer diameter of the focusing lens group and reduce its weight. Accordingly, in the case where autofocussing is conducted by the variable magnification optical system according to the second embodiment of the present application, it is possible to reduce load of a motor for driving the focusing lens. Also, while making magnification of the variable magnification optical system according to the second embodiment of the present application large upon focusing on a close distant object, it is possible to suppress variation in aberration such as spherical aberration to be small upon focusing on the close distant object.

In the variable magnification optical system according to the second embodiment of the present application, it is preferable that the front group of the first lens group is composed of a single lens having positive refractive power, and the rear group of the first lens group is composed of, in order from the object side, a negative lens, a positive lens and a positive lens.

By adopting such configuration, while the rear group that is the focusing lens group is made small in size and light in weight, it is possible to suppress variations in spherical aberration and curvature of field upon focusing to be small.

The optical apparatus of the present application is characterized in the provision of the variable magnification optical system according to the second embodiment as described above. By such configuration, it is possible to realize the optical apparatus which can suppress deterioration in optical performances upon conducting vibration reduction and which has excellent optical performance from the wide angle end state to the telephoto end state.

The method for manufacturing the variable magnification optical system according to the second embodiment of the present application is a method for manufacturing a variable magnification optical system comprising, in order from an object side: a first lens group having positive refractive power; a second lens group having negative refractive power; a third lens group having positive refractive power; and a fourth lens group having positive refractive power;
  the method comprising the steps of:
  constructing the fourth lens group to comprise, in order from the object side, a first segment lens group having positive refractive power, a second segment lens group having negative refractive power and a third segment lens group having positive refractive power;
  constructing the fourth lens group to satisfy the following conditional expressions (5) and (6):

$$-1.60 < f4B/f4C < -0.50 \qquad (5)$$

$$-1.60 < f4/f4B < -0.60 \qquad (6)$$

where f4 denotes a focal length of the fourth lens group, f4B denotes a focal length of the second segment lens group, and f4C denotes a focal length of the third segment lens group;

constructing at least the second lens group and the third lens group to be movable in the direction of the optical axis such that, upon zooming from a wide-angle end state to a telephoto end state, the first lens group is fixed in a position in the direction of the optical axis, a distance between the first lens group and the second lens group is increased and a distance between the second lens group and the third lens group is decreased; and constructing at least a portion of the second segment lens group to be moved, as a vibration reduction lens group, to have a component in a direction perpendicular to the optical axis.

Hereinafter, the variable magnification optical system, the optical apparatus and the method for manufacturing the variable magnification optical system according to the third embodiment of the present application is explained.

A variable magnification optical system according to the third embodiment of the present application comprises, in order from an object side: a first lens group having positive refractive power; a second lens group having negative refractive power; a third lens group having positive refractive power; and a fourth lens group having positive refractive power;

an antireflection coating being formed on at least one of optical surfaces in the first lens group and the fourth lens group;

the antireflection coating including at least one layer formed by a wet process, upon zooming from a wide-angle end state to a telephoto end state, the first lens group being fixed in a position in the direction of the optical axis, at least the second lens group and the third lens group being moved in the direction of the optical axis such that a distance between the first lens group and the second lens group is increased and a distance between the second lens group and the third lens group is decreased;

at least a portion of the first to the fourth lens groups being moved, as a vibration reduction lens group, to have a component in a direction perpendicular to the optical axis; and the following conditional expression (1) being satisfied:

$$-1.20 < fw^2/(f13w \times f4) < -0.20 \qquad (1)$$

where f13w denotes a composite focal length of the first lens group to the third lens group in the wide angle end state, f4 denotes a focal length of the fourth lens group, and fw denotes a focal length of the variable magnification optical system in the wide angle end state.

In the variable magnification optical system according to the third embodiment of the present application, at least a portion of the first to the fourth lens groups is moved, as a vibration reduction lens group, to have a component in a direction perpendicular to the optical axis, as described above, so that it is possible to correct an image position upon camera shake being caused, in other words, it is possible to carry out vibration reduction.

The conditional expression (1) defines a conjugate length and a magnification of the fourth lens group.

The variable magnification optical system according to the third embodiment of the present application can reduce the conjugate length of the fourth lens group as a socalled master lens, that is, a distance between the front and rear imaging points thereof, by satisfying the conditional expression (1), thereby a space in which the first to third lens groups are movable are increased by the reduced conjugate length. As a result, upon zooming, an amount of movement of the second lens group can be increased, and variation in a distance between the second lens group and the third lens group can be reduced. Therefore, while maintaining the whole length of the variable magnification optical system according to the third embodiment of the present application, variations in aberrations upon zooming can be made small.

In the variable magnification optical system according to the third embodiment of the present application, when the value of $fw^2/(f13w \times f4)$ is equal to or exceeds the upper limit value of the conditional expression (1) of the variable magnification optical system according to the third embodiment of the present application, refractive power of the fourth lens group becomes small and variation in a distance between the second lens group and the third lens group upon zooming increases. As a result, variations in various aberrations such as curvature of field as well as coma become excessively large, and it becomes difficult to correct these aberrations in the intermediate focal length state. It is not desirable.

Meanwhile, in order to attain the advantageous effect of the present application more surely, it is preferable to set the upper limit value of the conditional expression (1) to −0.25.

On the other hand, in the variable magnification optical system according to the third embodiment of the present application, when the value of $fw^2/(f13w \times f4)$ is equal to or falls below the lower limit value of the conditional expression (1) of the variable magnification optical system according to the third embodiment of the present application, refractive power and magnification of the fourth lens group increase. Thus, spherical aberration and coma increase from the wide angle end state to the telephoto end state, and it becomes difficult to correct them so that it is not desirable.

Meanwhile, in order to attain the advantageous effect of the present application more surely, it is preferable to set the lower limit value of the conditional expression (1) to −0.60. Further, in order to attain the advantageous effect of the present application more surely, it is preferable to set the lower limit value of the conditional expression (1) to −0.45. Further, in order to attain the advantageous effect of the present application more surely, it is preferable to set the lower limit value of the conditional expression (1) to −0.35.

By configuring as described above, it is possible to realize a variable magnification optical system which can suppress variations in various aberrations upon zooming and has superb optical performance from the wide angle end state to the telephoto end state.

The variable magnification optical system according to the third embodiment of the present application is characterized in that an antireflection coating is formed on at least one of optical surfaces in the first lens group and the fourth lens group, and the antireflection coating includes at least one layer formed by a wet process.

With such configuration, the variable magnification optical system according to the third embodiment of the present application can reduce ghost as well as flare caused by light rays from the object being reflected by optical surfaces, and attain high image forming performance.

In the variable magnification optical system according to the third embodiment of the present application, it is preferable that the antireflection coating is a multi-layered film, and the layer formed by the wet process is a most outer surface side layer among layers of which the multi-layered film is composed. With this configuration, a difference in refractive index between the layer formed by the wet process and air can be made small, so that it is possible to reduce reflection of light and thereby a ghost as well as flare may be further decreased.

In the variable magnification optical system according to the third embodiment of the present application, it is preferable that, assuming that a refractive index with respect to d-line (wavelength λ=587.6 nm) of the layer formed by the wet process is nd, nd is 1.30 or less.

With such configuration, the difference in refractive index between the layer formed by the wet process and air can be made small, so that it becomes possible to reduce reflection of light more and decrease further ghost as well as flare.

Further, in the variable magnification optical system according to the third embodiment of the present application, it is desirable that an aperture stop is provided and the optical surface provided with the antireflection coating is a concave lens surface viewed from the aperture stop. The concave lens surface viewed from the aperture stop among optical surfaces in the first lens group and the fourth lens group is apt to generate reflection light more. For this reason, it is possible to decrease effectively ghost as well as flare by forming antireflection coating on such a lens surface.

Further, in the variable magnification optical system according to the third embodiment of the present application, it is desirable that the concave lens surface viewed from the aperture stop, is an object side lens surface of a lens in the first lens group. The concave lens surface viewed from the aperture stop among optical surfaces in the first lens group is apt to generate reflection light. For this reason, antireflection coating is formed on such a lens surface so as to decrease effectively ghost as well as flare.

Further, in the variable magnification optical system according to the third embodiment of the present application, it is desirable that the concave lens surface viewed from the aperture stop, is an image side lens surface of a lens in the first lens group. The concave lens surface viewed from the aperture stop among optical surfaces in the first lens group is apt to generate reflection light. For this reason, antireflection coating is formed on such a lens surface so as to decrease effectively ghost as well as flare.

Further, in the variable magnification optical system according to the third embodiment of the present application, it is desirable that the concave lens surface viewed from the aperture stop, is an image side lens surface of a lens in the fourth lens group. The concave lens surface viewed from the aperture stop among optical surfaces in the fourth lens group is apt to generate reflection light. For this reason, antireflection coating is formed on such a lens surface so as to decrease effectively ghost as well as flare.

Further, in the variable magnification optical system according to the third embodiment of the present application, it is desirable that the optical surface formed with the antireflection coating is a concave lens surface viewed from the image side. The concave lens surface viewed from the image side among optical surfaces in the first lens group and the fourth lens group is apt to generate reflection light. For this reason, antireflection coating is formed on such a lens surface so as to decrease effectively ghost as well as flare.

Further, in the variable magnification optical system according to the third embodiment of the present application, it is desirable that the concave lens surface viewed from the image side is an object side lens surface of a second lens from the object side in the fourth lens group. By the concave lens surface viewed from the image side among optical surfaces in the fourth lens group reflection light is apt to be generated. For this reason, antireflection coating is formed on such a lens surface so as to decrease effectively ghost as well as flare.

Further, in the variable magnification optical system according to the third embodiment of the present application, it is desirable that the concave lens surface viewed from the image side is an image side lens surface of a fourth lens from the image side in the fourth lens group. By the concave lens surface viewed from the image side among optical surfaces in the fourth lens group, reflection light is apt to be generated. For this reason, antireflection coating is formed on such a lens surface so as to decrease effectively ghost as well as flare.

Further, in the variable magnification optical system according to the third embodiment of the present application, it is desirable that the concave lens surface viewed from the image side is an object side lens surface of a third lens from the image side in the fourth lens group. By the concave lens surface viewed from the image side among optical surfaces in the fourth lens group, reflection light is apt to be generated. For this reason, antireflection coating is formed on such a lens surface so as to decrease effectively ghost as well as flare.

The antireflection coating in the variable magnification optical system according to the third embodiment of the present application, may be formed not only by the wet process, but also by a dry process. In this case, it is preferable that the antireflection coating includes at least one layer whose refractive index is 1.30 or less.

With such configuration, even if the antireflection coating is formed by the dry process, a similar effect to a case where the antireflection coating is formed by the wet process, can be attained.

Meanwhile, it is preferable that the layer whose refractive index is 1.30 or less is a most outer surface side layer in the multi-layers.

In the variable magnification optical system according to the third embodiment of the present application, it is preferable that the first lens group is composed of, in order from the object side, a front group having positive refractive power and a rear group having positive refractive power, and upon focusing from an infinitely distant object to a close distant object the rear group is moved toward the object side as the focusing lens group.

By configuring as above, the variable magnification optical system according to the third embodiment of the present application, can decrease outer diameter of the focusing lens group and reduce its weight. Accordingly, in the case where autofocussing is conducted by the variable magnification optical system according to the third embodiment of the present application, it is possible to reduce load of a motor for driving the focusing lens. Further, while making magnification of the variable magnification optical system according to the third embodiment of the present application large upon focusing on a close distant object, it is possible to suppress variation in aberration such as spherical aberration to be small upon focusing on the close distant object.

Further, in the variable magnification optical system according to the third embodiment of the present application, it is preferable that the most image side lens group in the variable magnification optical system has positive refractive power and is fixed in a position in the direction of the optical axis, upon zooming from the wide angle end state to the telephoto end state.

By such configuration, the variable magnification optical system according to the third embodiment of the present application, can easily make an f-number upon zooming constant, so that a stop mechanism of an aperture stop disposed in the variable magnification optical system can be simplified. Further, it is possible to decrease eccentricity or the like among the lens groups, so that deterioration in optical performance caused by manufacturing errors such as the eccentricity, and concretely, it is possible to decrease eccentric coma and eccentric image plane inclination.

Further, in the variable magnification optical system according to the third embodiment of the present application, it is preferable that, upon zooming from the wide angle end state to the photo end state, magnification of the second lens group varies so as to stride across the equi-magnification and the following conditional expression (2) is satisfied:

$$0.30 < \beta 2w \times \beta 2t < 0.90 \qquad (2)$$

where $\beta 2w$ denotes magnification of the second lens group in the wide angle end state, and $\beta 2t$ denotes magnification of the second lens group in the telephoto end state.

In the variable magnification optical system according to the third embodiment of the present application, upon zooming from the wide angle end state to the telephoto end state as described above, magnification of the second lens group changes so as to stride across the equi-magnification, that is to say, the magnification of the second lens group becomes −1 once on the way of zooming. By configuring as such, upon zooming, it is possible to reduce change in height of light rays through the second lens group, so that it is possible to make variations in curvature of field and coma to be small.

The conditional expression (2) defines a range of magnification of the second lens group. By satisfying the conditional expression (2), the variable magnification optical system according to the third embodiment of the present application can make variation in distance between the second lens group and the third lens group upon zooming small, and thereby deteriorations in coma and spherical aberration in the intermediate focal length state can be made small.

In the variable magnification optical system according to the third embodiment of the present application, when the value of $\beta 2w \times \beta 2t$ is equal to or exceeds the upper limit value of the conditional expression (2), amount of variation in the distance between the second lens group and the third lens group upon zooming increases, so that variations in various aberrations such as curvature of field and coma become excessively large and it becomes difficult to correct these aberrations in the intermediate focal length state. Also, amount of movement of the third lens group toward the object side upon zooming increases, and movement space for the second lens group becomes small. For this, it becomes difficult to correct curvature of field, spherical aberration and coma in the wide angle end state and the telephoto end state, so that it is undesirable.

Meanwhile, in order to attain the advantageous effect of the present application more surely, it is preferable to set the upper limit value of the conditional expression (2) to 0.80. Further, it is more preferable to set the upper limit value of the conditional expression (2) to 0.70.

On the other hand, in the variable magnification optical system according to the third embodiment of the present application, when the value of $\beta 2w \times \beta 2t$ is equal to or falls below the lower limit of the conditional expression (2) of the variable magnification optical system according to the third embodiment of the present application, the first lens group, the second lens group and the third lens group become too close to each other in the wide angle end state, so that it becomes difficult to correct coma and curvature of field. Also, focal length of the fourth lens group increases too much, and whole length and outer diameter of the variable magnification optical system according to the third embodiment of the present application become undesirably large.

Meanwhile, in order to attain the advantageous effect of the present application more surely, it is preferable to set the lower limit value of the conditional expression (2) to 0.50.

In the variable magnification optical system according to the third embodiment of the present application, it is preferable that the following conditional expressions (3) and (4) are satisfied:

$$0.290 < N1n - N1p \quad (3)$$

$$0.160 < N3n - N3p \quad (4)$$

where N1n denotes refractive index of a negative lens having the largest refractive index in the first lens group, N1p denotes refractive index of a positive lens having the smallest refractive index in the first lens group, N3n denotes refractive index of a negative lens having the largest refractive index in the third lens group, and N3p denotes refractive index of a positive lens having the smallest refractive index in the third lens group.

The conditional expression (3) defines difference in refractive index of the negative lens having the largest refractive index and refractive index of the positive lens having the smallest refractive index in the first lens group.

In the variable magnification optical system according to the third embodiment of the present application, with satisfying the conditional expression (3), it becomes possible to make curvature of each lens in the first lens group small, so that coma can be excellently corrected from the wide angle end state to the telephoto end state.

In the variable magnification optical system according to the third embodiment of the present application, when the value of N1n−N1p is equal to or falls below the lower limit value of the conditional expression (3) of the variable magnification optical system according to the third embodiment of the present application, it becomes difficult to correct coma from the wide angle end state to the telephoto end state. Further, variation in spherical aberration becomes large upon focusing on an infinitely distant object to a close distant object, so it is not preferable.

Meanwhile, in order to attain the advantageous effect of the present application more surely, it is preferable to set the lower limit value of the conditional expression (3) to 0.350. Further, in order to attain the advantageous effect of the present application more surely, it is preferable to set the lower limit value of the conditional expression (3) to 0.400.

The conditional expression (4) defines difference in refractive index of the negative lens having the largest refractive index and refractive index of the positive lens having the smallest refractive index in the third lens group.

In the variable magnification optical system according to the third embodiment of the present application, with satisfying the conditional expression (4), it becomes possible to make curvature of each lens in the third lens group small, so that coma can be excellently corrected from the wide angle end state to the telephoto end state.

In the variable magnification optical system according to the third embodiment of the present application, when the value of N3n−N3p is equal to or falls below the lower limit value of the conditional expression (4) of the variable magnification optical system according to the third embodiment of the present application, it becomes difficult to correct coma from the wide angle end state to the telephoto end state.

Meanwhile, in order to attain the advantageous effect of the present application more surely, it is preferable to set the lower limit value of the conditional expression (4) to 0.180.

Further, in the variable magnification optical system according to the third embodiment of the present application, it is preferable that the fourth lens group is composed of, in order from the object side, a first segment lens group having positive refractive power, a second segment lens group having negative refractive power, and a third segment lens group having positive refractive power, and at least a portion of the second segment lens group is moved to have a component in a direction perpendicular to the optical axis, as a vibration reduction lens.

By adopting at least a portion of the lens group having negative refractive power through which height of light rays is low as a vibration reduction lens, outer diameter of the vibration reduction lens can be made small. Further, if an aperture stop is disposed between the third lens group and the fourth lens group with adopting such configuration, the vibration reduction lens can be disposed in the neighborhood of a mid point between the aperture stop and the image plane, and accordingly variation in image height upon conducting vibration reduction can be suppressed to be small, and generation of eccentric coma can be suppressed to be small.

Further, in the variable magnification optical system according to the third embodiment of the present application, it is preferable that the second lens group comprises, in order from the object side, a negative lens, a first negative segment group having negative refractive power, and a second negative segment group having negative refractive power, and the first negative segment group and the second negative segment group are respectively composed of a positive lens and a negative lens, that is, two lenses in total.

By adopting such a configuration, angle of deviation of light rays on each lens surface in the second lens group in which variation in height of light rays is large upon zooming can be made small, so that it is possible to suppress curvature of field, spherical aberration and variation in coma, upon zooming to be small. Also, it is possible to make refractive power of the entire second lens group to be large, so whole length of the variable magnification optical system according to the third embodiment of the present application can be reduced. Further, deterioration in optical performance due to manufacturing error such as eccentricity between lenses in the second lens group may be reduced, more concretely, eccentric coma and eccentric image plane inclination can be reduced.

In the variable magnification optical system according to the third embodiment of the present application, it is preferable that the front group of the first lens group is composed of a single lens having positive refractive power, and the rear group of the first lens group is composed of, in order from the object, a negative lens, a positive lens and a positive lens.

By adopting such a configuration, while the rear group that is the focusing lens group is made to be small in outer diameter and light in weight, variations in spherical aberration and curvature of field upon focusing can be suppressed to be small.

The optical apparatus of the present application is characterized in the provision of the variable magnification optical system according to the third embodiment as described above. By such a configuration, it is possible to realize the optical apparatus which can suppress variations in aberrations upon zooming and has excellent optical performance from the wide angle end state to the telephoto end state.

The method for manufacturing the variable magnification optical system according to the third embodiment of the present application is a method for manufacturing a variable magnification optical system comprising, in order from an object side: a first lens group having positive refractive power; a second lens group having negative refractive power; a third lens group having positive refractive power; and a fourth lens group having positive refractive power;

the method comprising the steps of:

forming an antireflection coating on an at least one of optical surfaces in the first lens group and the fourth lens group such that the antireflection coating includes at least one layer formed by a wet process;

constructing the first lens group to the fourth lens group so as to satisfy the following conditional expression:

$$-1.20 < fw^2/(f13w \times f4) < -0.20 \qquad (1)$$

where f13w denotes a composite focal length of the first lens group to the third lens group in the wide angle end state, f4 denotes a focal length of the fourth lens group, and fw denotes a focal length of the variable magnification optical system in the wide angle end state;

constructing at least the second lens group and the third lens group to be movable in a direction of the optical axis such that, upon zooming from a wide-angle end state to a telephoto end state, the first lens group is fixed in a position in the direction of the optical axis, a distance between the first lens group and the second lens group is increased and a distance between the second lens group and the third lens group is decreased; and constructing at least a portion of the first group to the fourth lens group, as a vibration reduction lens group, to be moved to have a component in a direction perpendicular to the optical axis.

Thus, according to the present method, it is possible to manufacture the variable magnification optical system which can suppress variations in aberrations upon zooming, thereby reducing ghost as well as flare, and attain excellent optical performance from the wide angle end state to the telephoto end state.

Hereinafter, a variable magnification optical system relating to numerical examples according to the first to the third embodiments of the present application will be explained with reference to the accompanying drawings. Meanwhile, the First to the Third Examples are common to all of the first to the third embodiments.

FIRST EXAMPLE

FIG. 1 is a sectional view showing a configuration of a variable magnification optical system according to the First Example that is common to the first to third embodiments of the present application.

The variable magnification optical system according to the present Example is composed of, in order from an object side: a first lens group G1 having positive refractive power; a second lens group G2 having negative refractive power; a third lens group G3 having positive refractive power; and a fourth lens group G4 having positive refractive power.

The first lens group G1 consists of, in order from the object side, a front group G1A having positive refractive power and a rear group G1B having positive refractive power.

The front group G1A consists of a positive meniscus lens L11 having a convex surface facing the object side.

The rear group G1B consists of, in order from the object side, a cemented lens constructed by a negative meniscus lens L12 having a convex surface facing the object side cemented with a double convex positive lens L13, and a positive meniscus lens L14 having a convex surface facing the object side.

The second lens group G2 consists of, in order from the object side, a double concave negative lens L21, a first negative segment group G2A having negative refractive power and a second negative segment group G2B having negative refractive power.

The first negative segment group G2A consists of, in order from the object side, a cemented lens constructed by a double concaved negative lens L22 cemented with a positive meniscus lens L23 having a convex surface facing the object side.

The second negative segment group G2B consists of, in order from the object side, a cemented lens constructed by a double concaved negative lens L24 cemented with a plano-convex positive lens L25 having a convex surface facing the object side.

The third lens group G3 consists of, in order from the object side, a cemented lens constructed by a double convex positive lens L31 cemented with a negative meniscus lens L32 having a concave surface facing the object side.

The fourth lens group G4 consists of, in order from the object side, a first segment lens group G4A having positive refractive power, a second segment lens group G4B having negative refractive power, and a third segment lens group G4C having positive refractive power.

The first segment lens group G4A consists of, in order from the object side, a plano-convex positive lens L41 having a convex surface facing the object side, and a cemented lens constructed by a double convex positive lens L42 cemented with a double concave negative lens L43.

The second segment lens group G4B consists of, in order from the object side, a cemented lens constructed by a double convex positive lens L44 cemented with a double concave negative lens L45, and a double concave negative lens L46.

The third segment lens group G4C consists of, in order from the object side, a double convex positive lens L47, a double convex positive lens L48 and a negative meniscus lens L49 having a concave surface facing the object side.

In the variable magnification optical system according to the present Example, an aperture stop S is disposed between the third lens group G3 and the fourth lens group G4. A flare stopper FS is disposed between the first segment lens group G4A and the second segment lens group G4B in the fourth lens group G4.

In the variable magnification optical system according to the present Example, an antireflection coating hereinafter described is formed on an object side lens surface (surface number 3) of the negative meniscus lens L12 in the first lens group G1 as well as on an object side lens surface (surface number 6) of the positive meniscus lens L14 in the first lens group G1.

In the variable magnification optical system according to the present Example, zooming from the wide angle end state to the telephoto end state, is conducted by moving the second lens group G2 and the third lens group G3 in the direction of the optical axis such that a distance between the first lens group G1 and the second lens group G2 is increased and a distance between the second lens group G2 and the third lens group G3 is decreased. At this time the first lens group G1, the fourth lens group G4 and the aperture stop S are fixed in the respective positions in the direction of the optical axis.

In the variable magnification optical system according to the present Example, the rear group G1B in the first lens group G1 is moved along the optical axis, as the focusing lens group, thereby conducting focusing from an infinitely distant object to a close distant object.

In the variable magnification optical system according to the present Example, the second segment lens group G4 in the fourth lens group G4 is moved, as a vibration reduction lens group, to have a component in a direction perpendicular to the optical axis, thereby conducting vibration reduction.

It is noted that in a lens system having a focal length f of the whole lens system and a vibration reduction coefficient K, which is a ratio of a moving amount of an image on the image plane I to a moving amount of the vibration reduction lens group upon conducting a vibration reduction, it is possible to correct rotational camera shake of an angle θ, by moving the vibration reduction lens group by the amount of (f·tan θ)/K perpendicularly to the optical axis.

Accordingly, in the variable magnification optical system according to the present Example, in the wide angle end state, the vibration reduction coefficient K is −1.28, and the focal length is 71.40 (mm), so that the moving amount of the second segment lens group G4B for correcting a rotational camera shake of 0.60 degrees is 0.58 (mm). In the telephoto end state, the vibration reduction coefficient K is −1.28, and the focal length is 194.00 (mm), so that the moving amount of the second segment lens group G4B for correcting a rotational camera shake of 0.40 degrees is 1.06 (mm).

Table 1 below shows various values of the variable magnification optical system according to the present Example.

In table 1, f denotes a focal length, and BF denotes a back focal length (a distance on the optical axis between the most image side lens surface and the image plane I).

In [Surface Data], m denotes an order of an optical surface counted from the object side, r denotes a radius of curvature, d denotes a surface-to-surface distance (an interval from an n-th surface to an (n+1)-th surface, where n is an integer.), nd denotes refractive index for d-line (wavelength λ=587.6 mm) and υd denotes an Abbe number for d-line (wavelength λ=587.6 mm). Further, OP denotes an object surface, and I denotes an image plane. Meanwhile, radius of curvature r=∞ denotes a plane surface. The position of an aspherical surface is expressed by attaching "*" to the surface number, and in the column of the radius of curvature, a paraxial radius of curvature is shown.

In [Aspherical Data], with respect to an aspherical surface shown in [Surface Data], an aspherical surface coefficient and a conical coefficient are shown in the case where the aspherical surface is exhibited by the following expression:

$$x=(h^2/r)/[1+\{1-\kappa(h/r)^2\}^{1/2}]+A4h^4+A6h^6$$

where h denotes a vertical height from the optical axis, x denotes a sag amount which is a distance along the optical axis from the tangent surface at the vertex of the aspherical surface to the aspherical surface at the vertical height from the optical axis, κ denotes a conical coefficient, A4 and A6 denote respective aspherical coefficients, and r denotes a paraxial radius of curvature that is a radius of curvature of a reference sphere. "E−n", where n is an integer, denotes "×10⁻ⁿ", for example, "1.234E−05" denotes "1.234×10⁻⁵". The 2nd order aspherical surface coefficient A2 is 0, and omitted in the description.

In [Various Data], FNO denotes an f-number, ω denotes a half angle of view (unit "°"), Y denotes an image height, TL denotes a total length of the variable magnification optical system, that is, a distance along the optical axis from the first surface to the image plane I, do denotes a variable interval between an n-th surface and an (n+1)-th surface. Meanwhile, W denotes a wide-angle end state, M denotes an intermediate focal length state, and T denotes a telephoto end state.

In [Lens Group Data], ST denotes a starting surface number, that is, the most object side lens surface, of each lens group.

In [Values for Conditional Expressions], values corresponding to respective conditional expressions are shown.

It is noted, here, that "mm" is generally used for the unit of length such as the focal length f, the radius of curvature r and the unit for other lengths shown in Table 1. However, since similar optical performance can be obtained by an optical system proportionally enlarged or reduced its dimension, the unit is not necessarily to be limited to "mm".

The explanation of reference symbols in Table 1 described above, is the same in Tables for the other Examples.

TABLE 1

First Example

[Surface Data]

| m | r | d | nd | νd |
|---|---|---|---|---|
| OP | ∞ | | | |
| 1 | 140.3879 | 3.2500 | 1.487490 | 70.31 |
| 2 | 399.4846 | 16.2331 | 1.000000 | |
| 3 | 151.1551 | 2.0000 | 1.903660 | 31.27 |
| 4 | 77.3360 | 6.2000 | 1.497820 | 82.57 |
| 5 | −417.8459 | 0.1000 | 1.000000 | |
| 6 | 72.3229 | 5.2000 | 1.497820 | 82.57 |
| 7 | 810.3397 | d7 | 1.000000 | |
| 8 | −398.4538 | 1.3000 | 1.834810 | 42.73 |
| 9 | 49.6681 | 3.9000 | 1.000000 | |
| 10 | −83.0944 | 1.2500 | 1.618000 | 63.34 |
| 11 | 54.6110 | 2.5500 | 1.846660 | 23.80 |
| 12 | 399.8540 | 1.4500 | 1.000000 | |
| 13 | −70.8083 | 1.2500 | 1.729160 | 54.61 |
| 14 | 84.0230 | 2.1500 | 1.846660 | 23.80 |
| 15 | ∞ | d15 | 1.000000 | |
| 16 | 204.9027 | 5.2000 | 1.717000 | 47.98 |
| 17 | −32.6310 | 1.4000 | 1.903660 | 31.27 |
| 18 | −73.6790 | d18 | 1.000000 | |
| 19 | ∞ | 0.4000 | 1.000000 | Aperture Stop S |
| 20 | 49.2393 | 3.7500 | 1.772500 | 49.62 |
| 21 | ∞ | 0.3000 | 1.000000 | |
| 22 | 35.5052 | 4.9000 | 1.497820 | 82.57 |
| 23 | −162.2410 | 1.8500 | 1.903660 | 31.27 |
| 24 | 41.9940 | 14.3500 | 1.000000 | |
| 25 | ∞ | 0.5000 | 1.000000 | Flare Stopper FS |
| 26 | 85.3575 | 4.0000 | 1.805180 | 25.45 |
| 27 | −47.5520 | 1.2000 | 1.603110 | 60.69 |
| 28 | 54.4401 | 4.0000 | 1.000000 | |
| 29 | −254.0256 | 1.2000 | 2.000690 | 25.46 |
| 30 | 63.7889 | 3.9000 | 1.000000 | |
| 31 | 81.7216 | 4.0000 | 1.589130 | 61.22 |
| 32 | −81.7216 | 0.7000 | 1.000000 | |
| 33 | 77.7312 | 4.2000 | 1.719990 | 50.27 |
| 34 | −77.7312 | 6.5000 | 1.000000 | |
| 35 | −41.7728 | 2.0000 | 1.834000 | 37.18 |
| 36 | −200.4805 | BF | 1.000000 | |
| I | ∞ | | | |

[Various Data]
variable magnification ratio 2.72

| | W | M | T |
|---|---|---|---|
| f | 71.4 | 135.0 | 194.0 |
| FNO | 4.1 | 4.1 | 4.1 |
| ω | 17.4° | 8.9° | 6.2° |
| Y | 21.6 | 21.6 | 21.6 |
| TL | 218.3 | 218.3 | 218.3 |
| BF | 63.693 | 63.693 | 63.693 |
| d7 | 2.435 | 27.748 | 37.096 |

TABLE 1-continued

First Example

| | | | |
|---|---|---|---|
| d15 | 25.093 | 13.529 | 1.423 |
| d18 | 15.877 | 2.127 | 4.886 |

[Lens Group Data]

| | ST | f |
|---|---|---|
| G1 | 1 | 100.018 |
| G1A | 1 | 442.202 |
| G1B | 3 | 122.385 |
| G2 | 8 | −28.545 |
| G3 | 16 | 100.062 |
| G4 | 19 | 85.726 |

[Values for Conditional Expression]

Figure 2A:
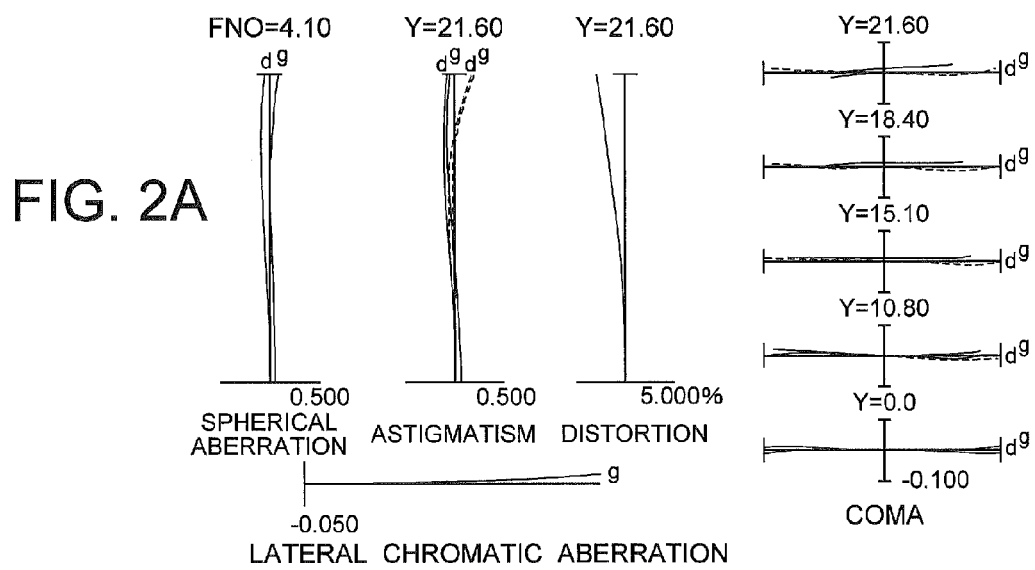
Figure 2B:
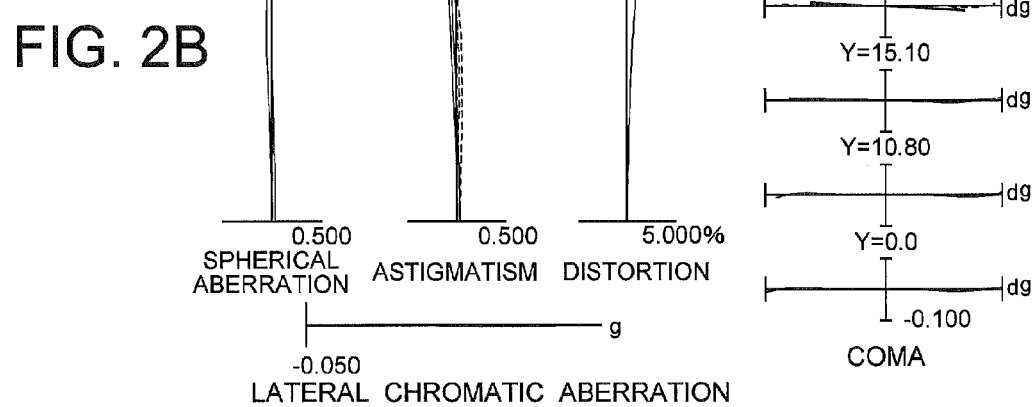
Figure 2C:
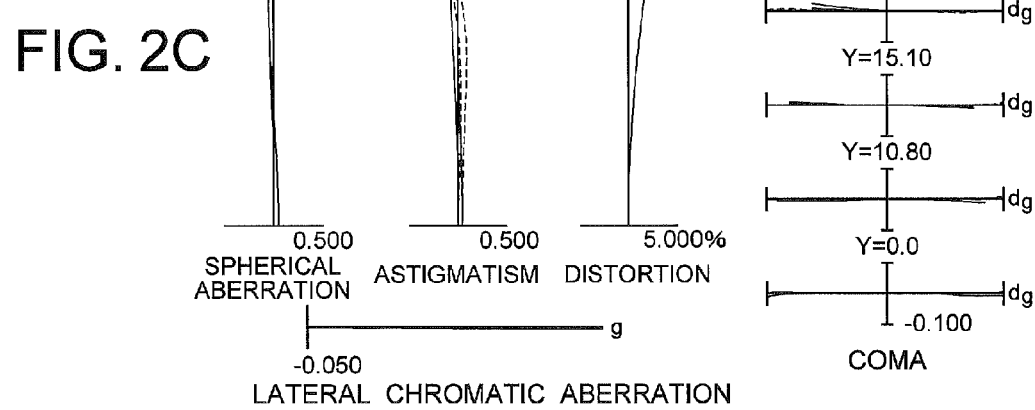
Figure 3A:
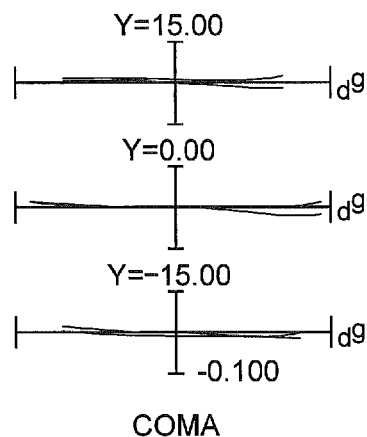
Figure 3B:
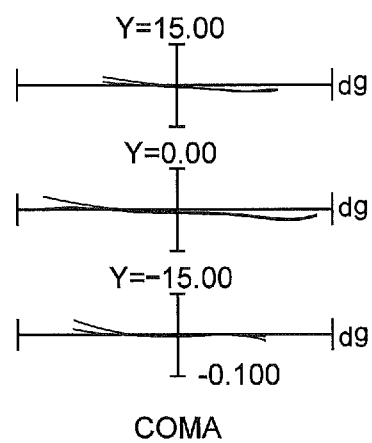

(1) $fw^2/(f13w \times f4) = -0.26$
(2) $\beta 2w \times \beta 2t = 0.70$
(3) $N1n - N1p = 0.416$
(4) $N3n - N3p = 0.187$
(5) $f4B/f4C = -1.29$
(6) $f4/f4B = -1.37$ FIGS. 2A, 2B and 2C are graphs showing various aberrations of the variable magnification optical system according to the First Example upon focusing on an infinitely distant object, in which FIG. 2A is in a wide-angle end state, FIG. 2B is in an intermediate focal length state, and FIG. 2C is in a telephoto end state. FIGS. 3A and 3B are graphs showing meridional transverse aberration of the variable magnification optical system according to The First Example upon focusing on an infinitely distant object with carrying out vibration reduction, in which FIG. 3A is in a wide-angle end state, FIG. 3B is in a telephoto end state.

In respective graphs, FNO denotes an f-number, Y denotes an image height. In respective graphs, d denotes an aberration curve at d-line (wavelength λ=587.6 nm), and g denotes an aberration curve at g-line (wavelength λ=435.8 nm). In the graph showing astigmatism, a solid line indicates a sagittal image plane, and a broken line indicates a meridional image plane.

Incidentally, the above-described explanation regarding various aberration graphs is the same as the other Examples.

As is apparent from the respective graphs, the variable magnification optical system according to the present Example shows superb optical performance as a result of good corrections to various aberrations in the wide-angle end state, in the intermediate focal length state, and in the telephoto end state, and also shows superb optical performance upon carrying out vibration reduction.

Here, explanation is made on reasons why ghost as well as flare is generated in the variable magnification optical system according to the present Example.

Figure 12:
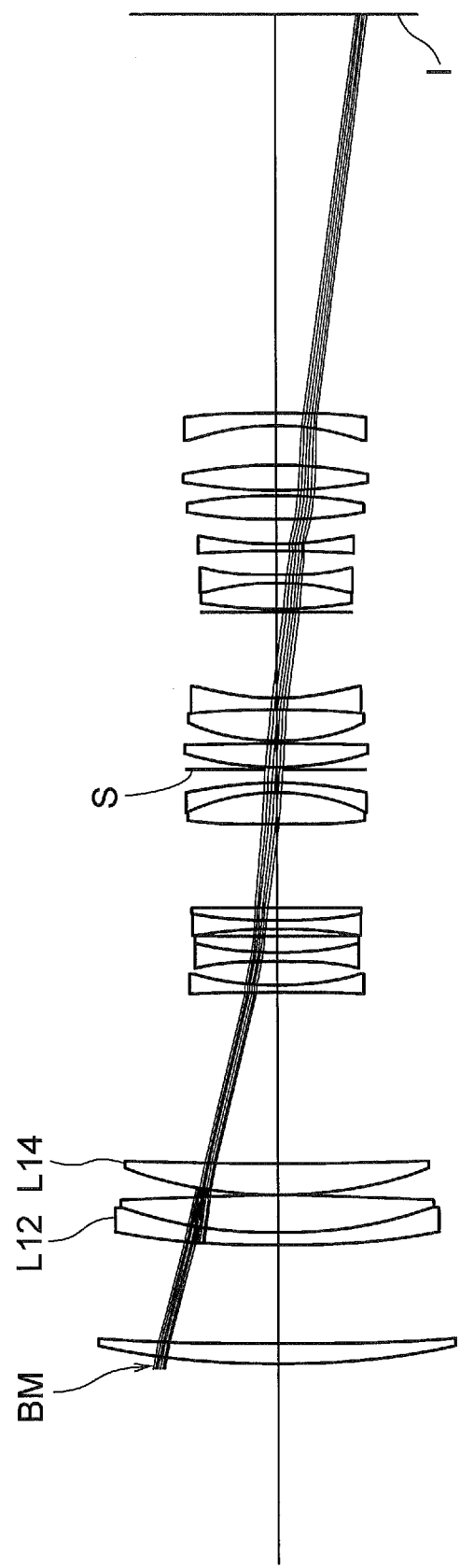
FIG. 12 is a view showing an example of a state where light rays incident in the variable magnification optical system according to the First Example of the present application are reflected by a first reflecting surface and a second reflecting surface therein and generate ghost and flare on the image plane.

FIG. 12 is a view showing an example of a state where light rays incident in the variable magnification optical system according to the present Example are reflected by a first reflecting surface and a second reflecting surface therein and generate ghost as well as flare on the image plane I.

In FIG. 12, light rays BM from the object side gets incident in the variable magnification optical system, as shown. Then, a portion of the light rays BM are reflected by an object side lens surface (surface number 6, a first reflecting surface that generates ghost as well as flare) of the positive meniscus lens L14 in the first lens group G1, and further reflected again by an object side lens surface (surface number 3, a second reflecting surface that generates ghost as well as flare) of the negative meniscus lens L12 in the first lens group G1, and finally reaches the image plane I at which ghost as well as flare is generated. The first reflecting surface and the second reflecting surface are concave lens surfaces viewed from the aperture stop S and the image plane I.

In the variable magnification optical system of the present Example, antireflection coatings corresponding to light rays of broad wavelength range and large incident angles are formed on such lens surfaces, so that generation of reflection light is suppressed and ghost as well as flare are effectively reduced.

SECOND EXAMPLE

FIG. 4 is a sectional view showing a configuration of a variable magnification optical system according to the Second Example that is common to the first to third embodiments of the present application.

The variable magnification optical system according to the present Example is composed of, in order from an object side: a first lens group G1 having positive refractive power; a second lens group G2 having negative refractive power; a third lens group G3 having positive refractive power; and a fourth lens group G4 having positive refractive power.

The first lens group G1 consists of, in order from the object side, a front group G1A having positive refractive power and a rear group G1B having positive refractive power.

The front group G1A consists of a positive meniscus lens L11 having a convex surface facing the object side.

The rear group G1B consists of, in order from the object side, a cemented lens constructed by a negative meniscus lens L12 having a convex surface facing the object side cemented with a double convex positive lens L13, and a positive meniscus lens L14 having a convex surface facing the object side.

The second lens group G2 consists of, in order from the object side, a double concave negative lens L21, a first negative segment group G2A having negative refractive power and a second negative segment group G2B having negative refractive power.

The first negative segment group G2A consists of, in order from the object side, a cemented lens constructed by a double concave negative lens L22 cemented with a positive meniscus lens L23 having a convex surface facing the object side.

The second negative segment group G2B consists of, in order from the object side, a cemented lens constructed by a positive meniscus lens L24 having a concave surface facing the object side cemented with a negative meniscus lens L25 having a concave surface facing the object side.

The third lens group G3 consists of, in order from the object side, a cemented lens constructed by a double convex positive lens L31 cemented with a negative meniscus lens L32 having a concave surface facing the object side.

The fourth lens group G4 consists of, in order from the object side, a first segment lens group G4A having positive refractive power, a second segment lens group G4B having negative refractive power, and a third segment lens group G4C having positive refractive power.

The first segment lens group G4A consists of, in order from the object side, a double convex positive lens L41, and a cemented lens constructed by a double convex positive lens L42 cemented with a double concave negative lens L43.

The second segment lens group G4B consists of, in order from the object side, a cemented lens constructed by a positive meniscus lens L44 having a concave surface facing the object side cemented with a double concave negative lens L45.

The third segment lens group G4C consists of, in order from the object side, a double convex positive lens L46, a double convex positive lens L47 and a negative meniscus lens L48 having a concave surface facing the object side.

In the variable magnification optical system according to the present Example, an aperture stop S is disposed between the third lens group G3 and the fourth lens group G4. A flare stopper FS is disposed between the first segment lens group G4A and the second segment lens group G4B in the fourth lens group G4.

In the variable magnification optical system according to the present Example, antireflection coatings described hereinafter are respectively formed on an image side lens surface (surface number 7) of the positive meniscus lens L14 in the first lens group G1, on an object side lens surface (surface number 22) of the positive lens L42 in the fourth lens group G4, and on an image side lens surface (surface number 28) of the negative lens L45 in the fourth lens group G4.

In the variable magnification optical system according to the present Example, zooming from the wide angle end state to the telephoto end state, is conducted by moving the second lens group G2 and the third lens group G3 in the direction of the optical axis such that a distance between the first lens group G1 and the second lens group G2 is increased and a distance between the second lens group G2 and the third lens group G3 is decreased. At this time the first lens group G1, the fourth lens group G4 and the aperture stop S are fixed in the respective positions in the direction of the optical axis.

In the variable magnification optical system according to the present Example, the rear group G1B in the first lens group G1 is moved along the optical axis to the object side, as the focusing lens, thereby conducting focusing from an infinitely distant object to a close distant object.

In the variable magnification optical system according to the present Example, the second segment lens group G4B in the fourth lens group G4 is moved, as a vibration reduction lens group, to have a component in a direction perpendicular to the optical axis, thereby conducting vibration reduction.

In the variable magnification optical system according to the present Example, in the wide angle end state, the vibration reduction coefficient K is −1.30, and the focal length is 71.40 (mm), so that the moving amount of the second segment lens group G4 B for correcting a rotational camera shake of 0.60 degrees is 0.58 (mm). In the telephoto end state, the vibration reduction coefficient K is −1.30, and the focal length is 196.00 (mm), so that the moving amount of the second segment lens group G4B for correcting a rotational camera shake of 0.40 degrees is 1.05 (mm).

Table 2 below shows various values of the variable magnification optical system according to the present Example.

TABLE 2

Second Example

[Surface Data]

| m | r | d | nd | vd |
|---|---|---|---|---|
| OP | ∞ | | | |
| 1 | 114.3117 | 3.1000 | 1.487490 | 70.40 |
| 2 | 250.6300 | 1.5381 | 1.000000 | |
| 3 | 116.4884 | 2.0000 | 1.999900 | 31.27 |

TABLE 2-continued

Second Example

| | | | | |
|---|---|---|---|---|
| 4 | 70.4720 | 5.9000 | 1.497820 | 82.51 |
| 5 | −987.3232 | 0.1000 | 1.000000 | |
| 6 | 76.0165 | 5.0000 | 1.497820 | 82.51 |
| 7 | 1015.1759 | d7 | 1.000000 | |
| 8 | −447.0787 | 1.3000 | 1.834807 | 42.72 |
| 9 | 48.2871 | 3.4185 | 1.000000 | |
| 10 | −86.5586 | 1.2500 | 1.618000 | 63.37 |
| 11 | 54.3572 | 2.5000 | 1.846660 | 23.78 |
| 12 | 382.7325 | 1.8985 | 1.000000 | |
| 13 | −56.0641 | 2.2926 | 1.846660 | 23.78 |
| 14 | −33.9578 | 0.9753 | 1.729157 | 54.66 |
| 15 | −479.7755 | d15 | 1.000000 | |
| 16 | 185.6879 | 5.0000 | 1.717004 | 47.93 |
| 17 | −32.9760 | 1.4000 | 1.983660 | 31.27 |
| 18 | −68.7091 | d18 | 1.000000 | |
| 19 | ∞ | 0.4000 | 1.000000 | Aperture Stop S |
| 20 | 42.8768 | 5.0000 | 1.772499 | 49.61 |
| 21 | −206.7745 | 0.3000 | 1.000000 | |
| 22 | 76.8439 | 4.2000 | 1.497820 | 82.51 |
| 23 | −58.3375 | 1.8000 | 1.903660 | 31.27 |
| 24 | 79.4740 | 13.0000 | 1.000000 | |
| 25 | ∞ | 1.0000 | 1.000000 | Flare Stopper FS |
| 26 | −114.4458 | 4.2000 | 1.831206 | 36.74 |
| 27 | −24.6196 | 1.2000 | 1.714409 | 53.89 |
| 28 | 56.2022 | 3.7170 | 1.000000 | |
| 29 | 77.4062 | 4.0000 | 1.589130 | 61.16 |
| 30 | −86.5707 | 0.2588 | 1.000000 | |
| 31 | 173.1935 | 4.0000 | 1.719995 | 50.23 |
| 32 | −55.2566 | 4.9362 | 1.000000 | |
| 33 | −33.3186 | 2.0400 | 1.834000 | 37.16 |
| 34 | −123.8827 | BF | 1.000000 | |
| I | ∞ | | | |

[Various Data]
variable magnification ratio 2.75

| | W | M | T |
|---|---|---|---|
| f | 71.4 | 133.0 | 196.0 |
| FNO | 4.1 | 4.1 | 4.1 |
| ω | 17.4° | 9.1° | 6.1° |
| Y | 21.6 | 21.6 | 21.6 |
| TL | 215.0 | 215.0 | 215.0 |
| BF | 70.4 | 70.4 | 70.4 |
| d7 | 1.877 | 27.161 | 37.583 |
| d15 | 21.821 | 12.568 | 1.200 |
| d18 | 18.430 | 2.400 | 3.347 |

[Lens Group Data]

| | ST | f |
|---|---|---|
| G1 | 1 | 100.977 |
| G1A | 1 | 427.937 |
| G1B | 3 | 125.000 |
| G2 | 8 | −27.635 |
| G3 | 16 | 99.374 |
| G4 | 19 | 80.000 |

[Values for Conditional Expression]

(1) $fw^2/(f13w \times f4) = -0.36$
(2) $\beta 2w \times \beta 2t = 0.61$
(3) N1n − N1p = 0.512
(4) N3n − N3p = 0.267
(5) f4B/f4C = −1.05
(6) f4/f4B = −1.23

Figure 5A:
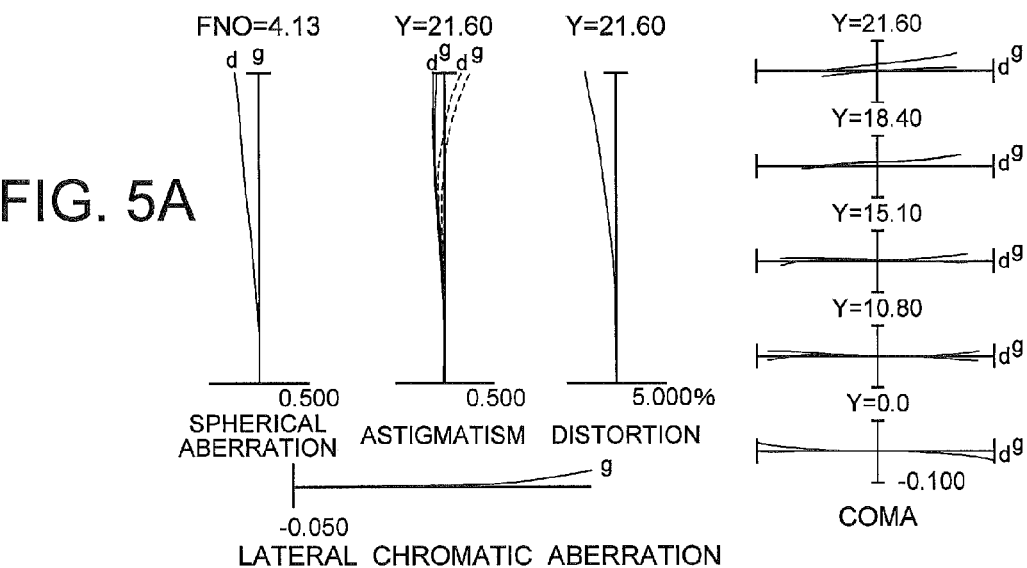
Figure 5B:
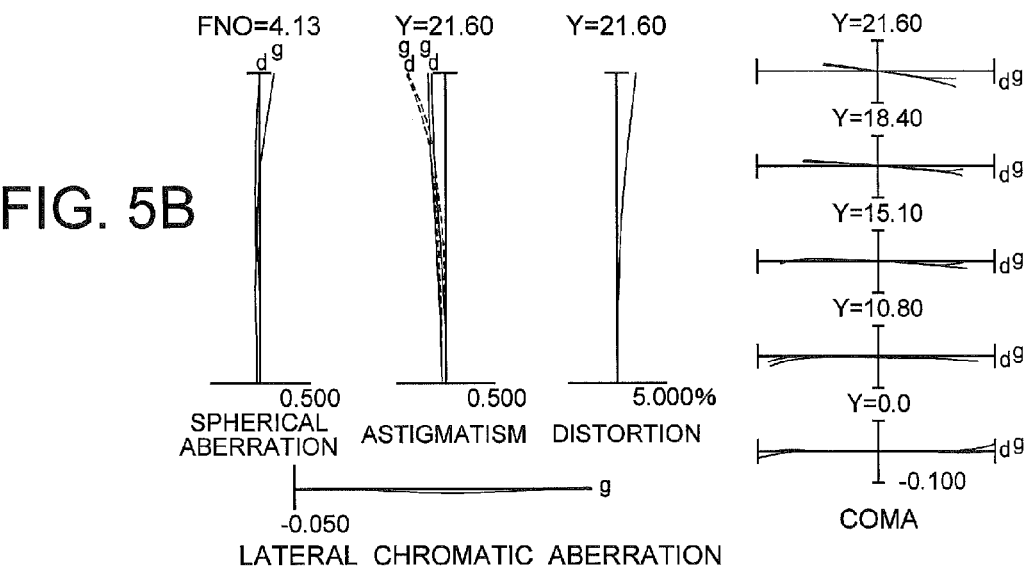
Figure 5C:
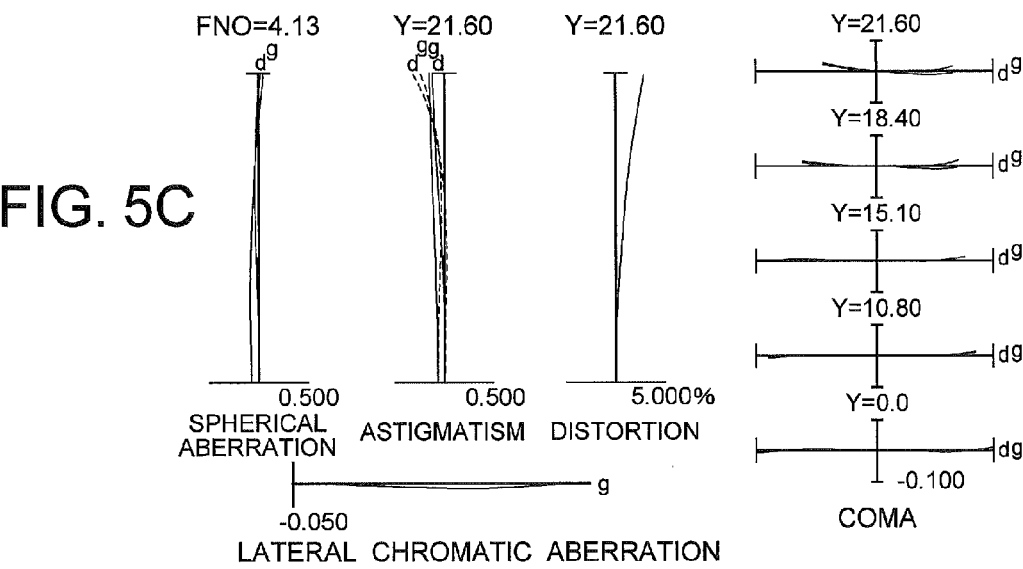

FIGS. 5A, 5B and 5C are graphs showing various aberrations of the variable magnification optical system according to the Second Example of the present application upon focusing on an infinitely distant object, in which FIG. 5A shows various aberrations in the wide-angle end state, FIG. 5B shows various aberrations in the intermediate focal length state, and FIG. 5C shows various aberrations in the telephoto end state.

Figure 6A:
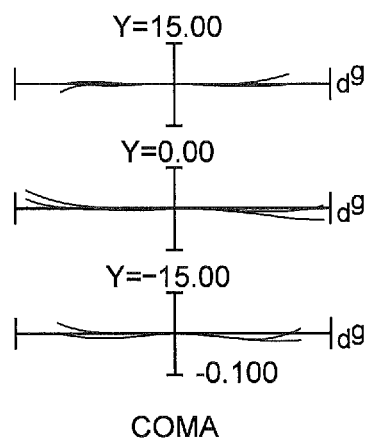
Figure 6B:
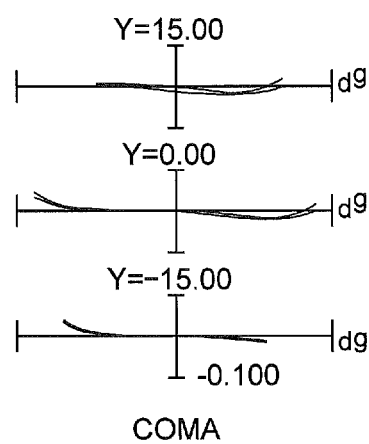

FIGS. 6A and 6B are graphs showing meridional transverse aberration of the variable magnification optical system according to the Second Example upon focusing on an infinitely distant object with conducting vibration reduction, in which FIG. 5A is in a wide-angle end state, FIG. 5B is in a telephoto end state.

As is apparent from the respective graphs, the variable magnification optical system according to the present Example shows superb optical performance as a result of good corrections to various aberrations in the wide-angle end state, in the intermediate focal length state, and in the telephoto end state, and also shows superb optical performance upon conducting vibration reduction.

THIRD EXAMPLE

Figure 7:
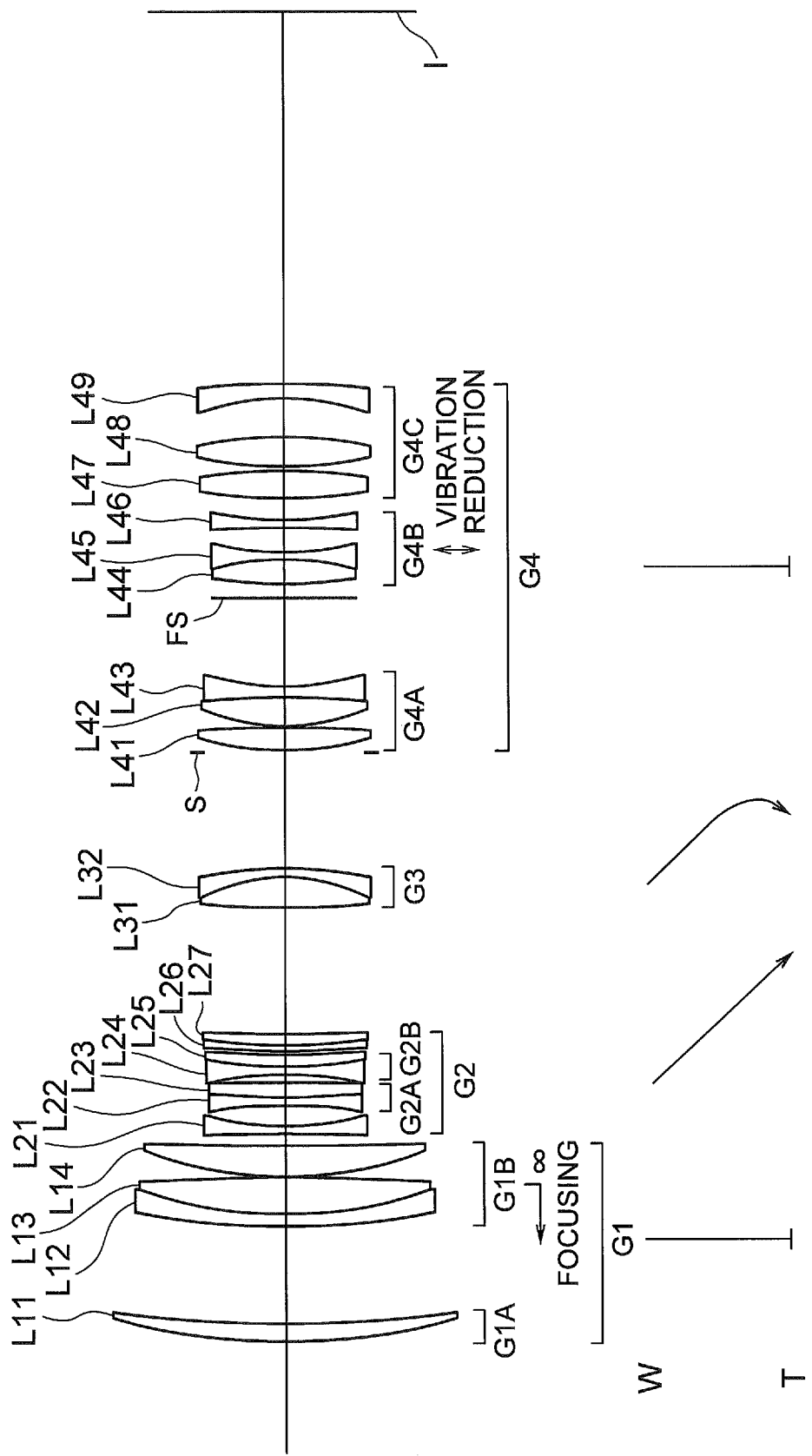
FIG. 7 is a sectional view showing a variable magnification optical system according to the Third Example that is common to a first to third embodiments of the present application.

FIG. 7 is a sectional view showing a configuration of a variable magnification optical system according to the Third Example that is common to the first to third embodiments of the present application.

The variable magnification optical system according to the present Example is composed of, in order from an object side: a first lens group G1 having positive refractive power; a second lens group G2 having negative refractive power; a third lens group G3 having positive refractive power; and a fourth lens group G4 having positive refractive power.

The first lens group G1 consists of, in order from the object side, a front group G1A having positive refractive power and a rear group G1B having positive refractive power.

The front group G1A consists of a positive meniscus lens L11 having a convex surface facing the object side.

The rear group G1B consists of, in order from the object side, a negative meniscus lens L12 having a convex surface facing the object side, a double convex positive lens L13, and a positive meniscus lens L14 having a convex surface facing the object side.

The second lens group G2 consists of, in order from the object side, a double concave negative lens L21, a first negative segment group G2A having negative refractive power and a second negative segment group G2B having negative refractive power, and a cemented lens constructed by a negative meniscus lens L26 having a convex surface facing the object side cemented with a positive meniscus lens L27 having a convex surface facing the object side.

The first negative segment group G2A consists of, in order from the object side, a cemented lens constructed by a double concave negative lens L22 cemented with a double convex positive lens L23.

The second negative segment group G2B consists of, in order from the object side, a cemented lens constructed by a double concave negative lens L24 cemented with a positive meniscus lens L25 having a convex surface facing the object side.

The third lens group G3 consists of, in order from the object side, a cemented lens constructed by a double convex positive lens L31 cemented with a negative meniscus lens L32 having a concave surface facing the object side.

The fourth lens group G4 consists of, in order from the object side, a first segment lens group G4A having positive refractive power, a second segment lens group G4B having negative refractive power, and a third segment lens group G4C having positive refractive power.

The first segment lens group G4A consists of, in order from the object side, a double convex positive lens L41, and a cemented lens constructed by a double convex positive lens L42 cemented with a double concave negative lens L43.

The second segment lens group G4B consists of, in order from the object side, a cemented lens constructed by a double convex positive lens L44 cemented with a double concave negative lens L45, and a double concave negative lens L46.

The third segment lens group G4C consists of, in order from the object side, a double convex positive lens L47, a double convex positive lens L48 and a negative meniscus lens L49 having a concave surface facing the object side.

In the variable magnification optical system according to the present Example, an aperture stop S is disposed between the third lens group G3 and the fourth lens group G4. A flare stopper FS is disposed between the first segment lens group G4A and the second segment lens group G4B in the fourth lens group G4.

In the variable magnification optical system according to the present Example, antireflection coatings described hereinafter are formed on an object side lens surface (surface number 35) of the positive lens L47 in the fourth lens group G4, and on an image side lens surface (surface number 38) of the positive lens L48 in the fourth lens group G4, respectively.

In the variable magnification optical system according to the present Example, zooming from the wide angle end state to the telephoto end state, is conducted by moving the second lens group G2 and the third lens group G3 in the direction of the optical axis such that a distance between the first lens group G1 and the second lens group G2 is increased and a distance between the second lens group G2 and the third lens group G3 is decreased. At this time the first lens group G1, the fourth lens group G4 and the aperture stop S are fixed in the respective positions in the direction of the optical axis.

In the variable magnification optical system according to the present Example, the rear group G1B in the first lens group G1 is moved along the optical axis, as the focusing lens group, thereby conducting focusing from an infinitely distant object to a close distant object.

In the variable magnification optical system according to the present Example, the second segment lens group G4B in the fourth lens group G4 is moved, as a vibration reduction lens group, to have a component in a direction perpendicular to the optical axis, thereby conducting vibration reduction.

In the variable magnification optical system according to the present Example, in the wide angle end state, the vibration reduction coefficient K is −1.25, and the focal length is 71.40 (mm), so that the moving amount of the second segment lens group G4B for correcting a rotational camera shake of 0.60 degrees is 0.60 (mm). In the telephoto end state, the vibration reduction coefficient K is −1.25, and the focal length is 196.00 (mm), so that the moving amount of the second segment lens group G4B for correcting a rotational camera shake of 0.40 degrees is 1.09 (mm).

Table 3 below shows various values of the variable magnification optical system according to the present Example.

TABLE 3

Third Example

[Surface Data]

| m | r | d | nd | vd |
|---|---|---|-----|-----|
| OP | ∞ | | | |
| 1 | 106.6632 | 3.1000 | 1.487490 | 70.40 |
| 2 | 199.7941 | 1.5692 | 1.000000 | |

TABLE 3-continued

Third Example

| | | | | |
|---|---|---|---|---|
| 3 | 142.3931 | 2.0000 | 1.903660 | 31.27 |
| 4 | 75.6158 | 0.2868 | 1.000000 | |
| 5 | 78.7661 | 5.9000 | 1.497820 | 82.51 |
| 6 | −383.8553 | 0.1000 | 1.000000 | |
| 7 | 71.4936 | 5.0000 | 1.497820 | 82.51 |
| 8 | 699.8249 | d8 | 1.000000 | |
| 9 | −393.6712 | 1.3000 | 1.834807 | 42.72 |
| *10 | 49.0673 | 3.4211 | 1.000000 | |
| 11 | −82.1898 | 1.2500 | 1.618000 | 63.37 |
| 12 | 101.6648 | 2.5000 | 1.846660 | 23.78 |
| 13 | −582.9212 | 1.3136 | 1.000000 | |
| 14 | −63.2759 | 1.2500 | 1.729157 | 54.66 |
| 15 | 72.4825 | 2.0000 | 1.846660 | 23.78 |
| 16 | 140.1819 | 0.5000 | 1.000000 | |
| 17 | 130.0000 | 1.0000 | 1.729157 | 54.66 |
| 18 | 72.4791 | 2.0000 | 1.846660 | 23.78 |
| 19 | 267.6447 | d19 | 1.000000 | |
| 20 | 197.2091 | 5.0000 | 1.717004 | 47.93 |
| 21 | −30.9148 | 1.4000 | 1.903660 | 31.27 |
| 22 | −68.1545 | d22 | 1.000000 | |
| 23 | ∞ | 0.4000 | 1.000000 | Aperture Stop S |
| 24 | 54.9704 | 3.5621 | 1.772499 | 49.61 |
| 25 | −382.1637 | 0.3000 | 1.000000 | |
| 26 | 35.3228 | 4.7657 | 1.497820 | 82.51 |
| 27 | −153.2875 | 1.8000 | 1.903660 | 31.27 |
| 28 | 43.4698 | 14.5500 | 1.000000 | |
| 29 | ∞ | 2.4000 | 1.000000 | Flare Stopper FS |
| 30 | 75.1521 | 4.0926 | 1.805181 | 25.43 |
| 31 | −49.2642 | 1.2000 | 1.603112 | 60.67 |
| 32 | 54.1850 | 4.0000 | 1.000000 | |
| 33 | −255.8175 | 1.2000 | 2.000690 | 25.45 |
| 34 | 59.1251 | 3.6931 | 1.000000 | |
| 35 | 89.8085 | 4.6000 | 1.589130 | 61.16 |
| 36 | −89.8089 | 0.7000 | 1.000000 | |
| 37 | 74.8902 | 4.9136 | 1.719995 | 50.23 |
| 38 | −74.8919 | 6.3038 | 1.000000 | |
| 39 | −43.2382 | 2.0400 | 1.834000 | 37.16 |
| 40 | −284.0645 | BF | 1.000000 | |
| I | ∞ | | | |

[Aspherical Surface Data]

| m | κ | A4 | A6 |
|---|---|---|---|
| 10 | 0.8103 | 2.25086E−08 | −4.50461E−10 |

[Various Data]
variable magnification ratio 2.75

| | W | M | T |
|---|---|---|---|
| f | 71.4 | 133.0 | 196.0 |
| FNO | 4.1 | 4.1 | 4.1 |
| ω | 17.4° | 9.1° | 6.1° |
| Y | 21.6 | 21.6 | 21.6 |
| TL | 219.5 | 219.5 | 219.5 |
| BF | 61.581 | 61.581 | 61.581 |
| d8 | 1.964 | 27.551 | 37.966 |
| d19 | 21.203 | 11.989 | 1.200 |
| d22 | 18.836 | 2.400 | 2.787 |

[Lens Group Data]

| | ST | f |
|---|---|---|
| G1 | 1 | 100.147 |
| G1A | 1 | 464.329 |
| G1B | 3 | 120.905 |
| G2 | 9 | −27.080 |
| G3 | 20 | 92.564 |
| G4 | 23 | 84.614 |

[Values for Conditional Expression]

(1) fw²/(f13w × f4) = −0.29
(2) β2w × β2t = 0.58
(3) N1n − N1p = 0.416
(4) N3n − N3p = 0.187

TABLE 3-continued

Third Example (5) f4B/f4C = −1.23
(6) f4/f4B = −1.34

Figure 8A:
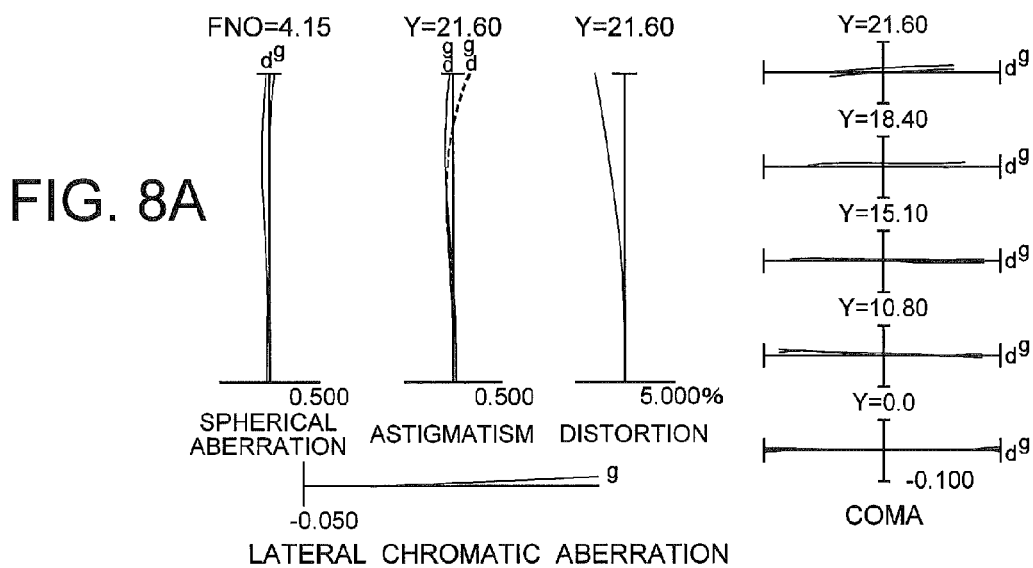
Figure 8B:
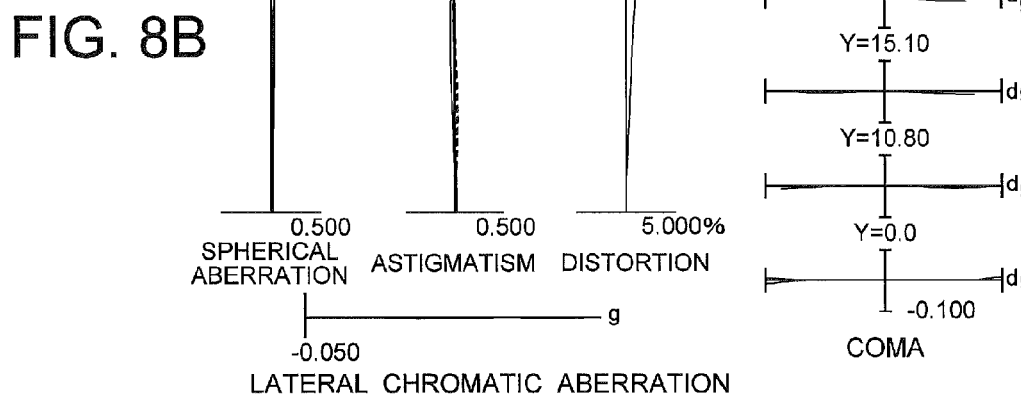
Figure 8C:
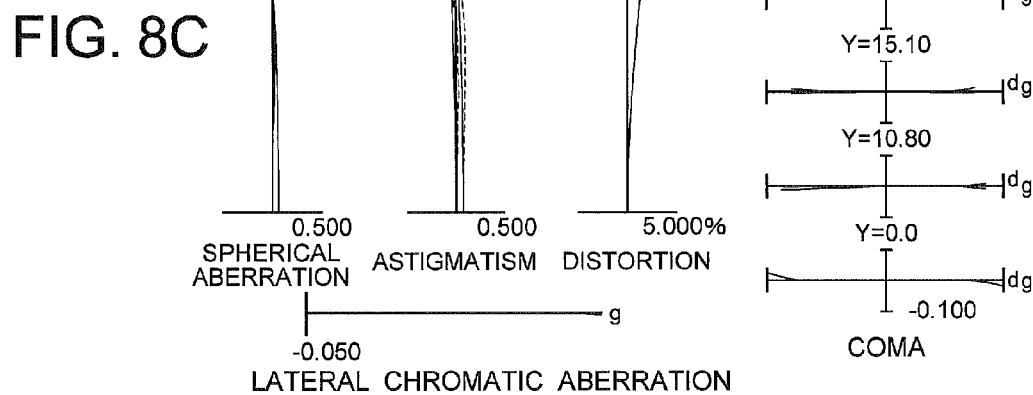

FIGS. 8A, 8B and 8C are graphs showing various aberrations of the variable magnification optical system according to the Third Example of the present application upon focusing on an infinitely distant object, in which FIG. 8A shows various aberrations in the wide-angle end state, FIG. 8B shows various aberrations in the intermediate focal length state, and FIG. 8C shows various aberrations in the telephoto end state.

Figure 9A:
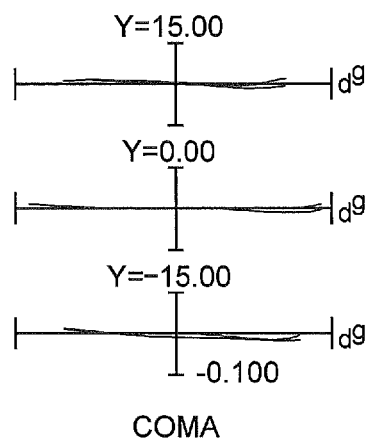
Figure 9B:
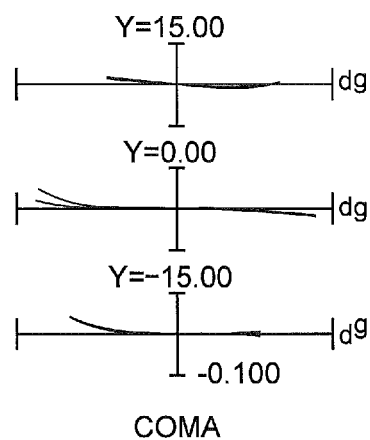

FIGS. 9A and 9B are graphs showing meridional transverse aberration of the variable magnification optical system according to the Second Example upon focusing on an infinitely distant object with conducting vibration reduction, in which FIG. 9A is in a wide-angle end state, FIG. 9B is in a telephoto end state.

As is apparent from the respective graphs, the variable magnification optical system according to the present Example shows superb optical performance as a result of good corrections to various aberrations in the wide-angle end state, in the intermediate focal length state, and in the telephoto end state, and also shows superb optical performance upon conducting vibration reduction.

Then, a multi-layered broadband antireflection coating which is an antireflection coating used for variable magnification optical systems according to the first to the third embodiments of the present application will be described.

Figure 13:
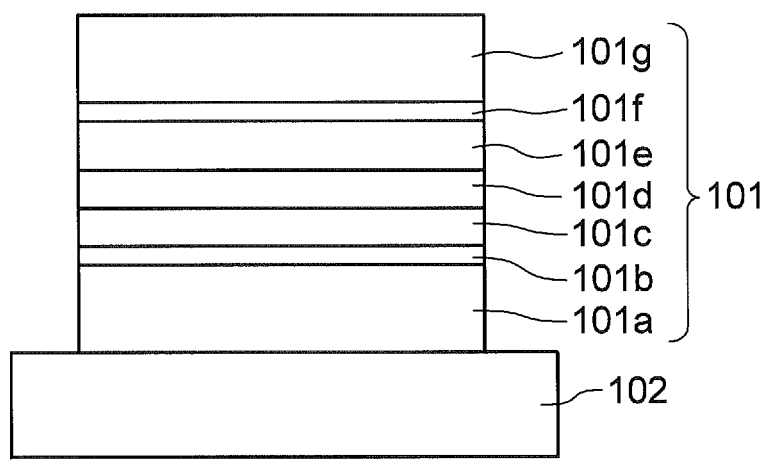
FIG. 13 is an explanatory view showing an example of a layer structure of an antireflection coating.

FIG. 13 is a view showing one example of a structure of an antireflection coating used for the variable magnification optical systems according to the first through the third embodiments of the present application.

The antireflection coating 101 is, as shown in FIG. 13, a 7-layered structure from a first layer 101a to a seventh layer 101g and formed on an optical surface of an optical member 102 such as a lens.

The first layer 101a consists of aluminum oxide vapor-deposited on the optical surface of the optical member 102 by a vacuum evaporation method.

A second layer 101b consists of a mixture of titanium oxide and zirconium oxide vapor-deposited on the first layer 101a by the vacuum evaporation method.

A third layer 101c consists of the aluminum oxide vapor-deposited on the second layer 101b by the vacuum evaporation method.

A fourth layer 101d consists of the mixture of titanium oxide and zirconium oxide vapor-deposited on the third layer 101c by the vacuum evaporation method.

A fifth layer 101e consists of aluminum oxide vapor-deposited on the fourth layer 101d by the vacuum evaporation method.

A sixth layer 101f consists of the mixture of titanium oxide and zirconium oxide vapor-deposited on the fifth layer 101e by the vacuum evaporation method.

A seventh layer 101g consists of a mixture of magnesium fluoride and silica formed on the sixth layer 101f by a wet process. The formation of the seventh layer 101g involves using a sol-gel process classified as one type of the wet process. The sol-gel process is a process of transforming a sol acquired by mixing a material into a gel having no fluidity through hydrolyzing condensation polymerization reaction and acquiring a product by heat-decomposing this gel. In manufacturing an optical thin film, the film may be generated by coating a material sol of the optical thin film over the optical surface of the optical member and dry-solidifying the sol into a gel film. Note that the wet process may involve using, without being limited to the sol-gel process, a process of acquiring a solid-state film through none of the gel state.

As described above, the first layer 101a through the sixth layer 101f of the antireflection coating 101 are formed by electron beam evaporation defined as a dry process, and the uppermost seventh layer 101g is formed by the wet process using a sol liquid prepared by a hydrogen fluoride/acetic acid magnesium process. The first layer 101a through the seventh layer 101g are formed in the following procedures.

To begin with, an aluminum oxide layer serving as the first layer 101a, a titanium oxide-zirconium oxide mixture layer serving as the second layer 101b, an aluminum oxide layer serving as the third layer 101c, a titanium oxide-zirconium oxide mixture layer serving as the fourth layer 101d, an aluminum oxide layer serving as the fifth layer 101e and a titanium oxide-zirconium oxide mixture layer serving as the sixth layer 101f, are formed in this sequence on a lens film growth surface that is the optical surface of the optical member 102 described above by using a vacuum evaporation apparatus.

Then, the layer composed of a mixture of magnesium fluoride and silica is formed as the seventh layer 101g by coating on the lens film growth surface silicon alkoxide-added sol liquid prepared by the hydrogen fluoride/acetic acid magnesium process in a way that uses a spin coating method. The formula (a) given below is a reaction formula on the occasion of being prepared by the hydrogen fluoride/acetic acid magnesium process:

2HF+Mg(CH3COO)2→MgF2+2CH3COOH  (a).

The sol liquid used for this film growth, after mixing the materials and after conducting a high-temperature pressurization maturing process at 140° C. for 24 hours in an autoclave, is used for growing the film. The optical member 102, after finishing the film growth of the seventh layer 101g, undergoes a heating process at 160° C. for one hour in the atmospheric air and is thus completed. With the use of the sol-gel process, particles on the order of several nanometers (nm) to several dozens nanometers (nm) in particle size are deposited while the air gaps remain, thereby forming the seventh layer 101g.

Optical performance of the optical member including the thus-formed antireflection coating 101 will hereinafter be described by using spectral characteristics shown in FIG. 14.

The lens which is the optical member including the antireflection coating according to the present application is formed under the conditions shown in the following Table 4. Herein, the Table 4 shows respective optical film thicknesses of the layers, that is, the first layer 101a through the seventh layer 101g of the antireflection coating 101, which are obtained under such conditions that λ denotes a reference wavelength and the refractive index of the substrate (optical member) is set to 1.62, 1.74 and 1.85. Note that the Table 4 and Tables 5 and 6 show Al2O3 expressed as the aluminum oxide, ZrO2+TiO2 expressed as the mixture of titanium oxide and zirconium oxide and MgF2+SiO2 expressed as the mixture of magnesium fluoride and silica. In Tables 4 to 6, N denotes refractive index and D denotes optical film thickness.

TABLE 4

| | material | N | D | D | D |
|---|---|---|---|---|---|
| medium | air | 1 | | | |
| 7th layer | MgF2 + SiO2 | 1.26 | 0.268λ | 0.271λ | 0.269λ |
| 6th layer | ZrO2 + TiO2 | 2.12 | 0.057λ | 0.054λ | 0.059λ |
| 5th layer | Al2O3 | 1.65 | 0.171λ | 0.178λ | 0.162λ |
| 4th layer | ZrO2 + TiO2 | 2.12 | 0.127λ | 0.13λ | 0.158λ |
| 3rd layer | Al2O3 | 1.65 | 0.122λ | 0.107λ | 0.08λ |
| 2nd layer | ZrO2 + TiO2 | 2.12 | 0.059λ | 0.075λ | 0.105λ |
| 1st layer | Al2O3 | 1.65 | 0.257λ | 0.03λ | 0.03λ |
| refractive index of substrate | | | 1.62 | 1.74 | 1.85 |

Figure 14:
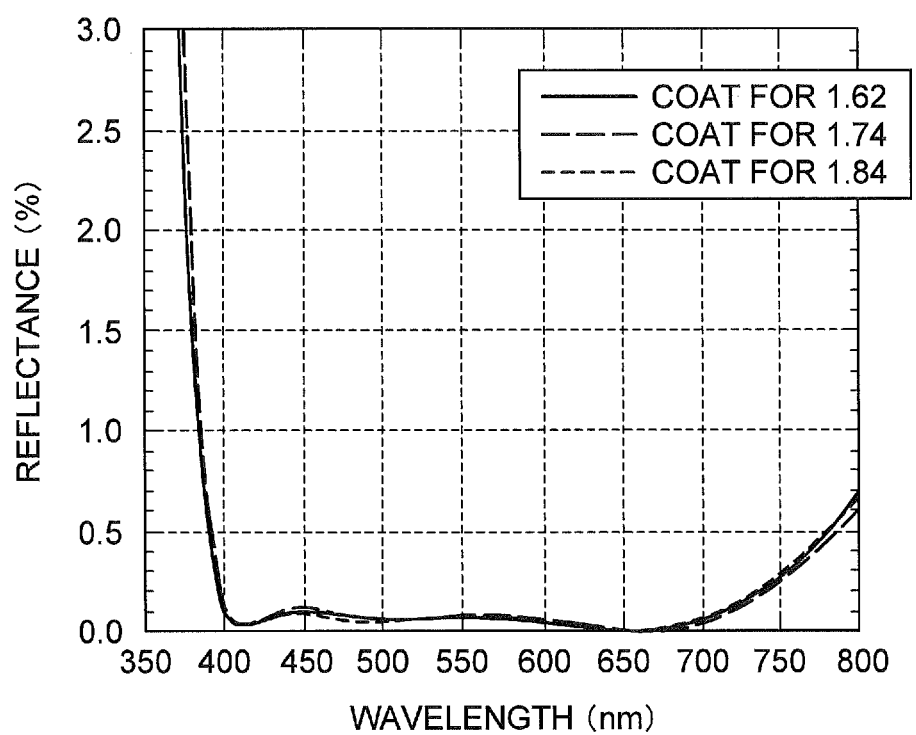
FIG. 14 is a graph showing a spectral characteristic of an antireflection coating.

FIG. 14 shows the spectral characteristics when the light beams vertically get incident on the optical member in which the optical film thickness of each of the layers of the antireflection coating 101 is designed, with the reference wavelength λ set to 550 nm in the Table 4.

It is understood from FIG. 14 that the optical member including the antireflection coating 101 designed with the reference wavelength λ set to 550 nm can restrain the reflectance down to 0.2% or less over the entire range in which the wavelengths of the light beams are 420 nm through 720 nm. Further, in the Table 4, even the optical member including the antireflection coating 101, in which each optical film thickness is designed with the reference wavelength λ set to the d-line (wavelength 587.6 nm), has substantially the same spectral characteristics as in the case where the reference wavelength λ shown in FIG. 14 is 550 nm in a way that affects substantially none of the spectral characteristics thereof.

Next, a modified Example of the antireflection coating will be explained.

The antireflection coating according to the modified Example has a 5-layered structure composed of the first layer through the fifth layer. Optical thickness of each layer with respect to reference wavelength λ is designed by conditions shown in Table 5 below, in the same way as Table 4. According to the modified Example, the aforementioned sol-gel method is used for forming the fifth layer.

TABLE 5

| | material | N | D | D |
|---|---|---|---|---|
| medium | air | 1 | | |
| 5th layer | MgF2 + SiO2 | 1.26 | 0.275λ | 0.269λ |
| 4th layer | ZrO2 + TiO2 | 2.12 | 0.045λ | 0.043λ |
| 3rd layer | Al2O3 | 1.65 | 0.212λ | 0.217λ |
| 2nd layer | ZrO2 + TiO2 | 2.12 | 0.077λ | 0.066λ |
| 1st layer | Al2O3 | 1.65 | 0.288λ | 0.290λ |
| refractive index of substrate | | | 1.46 | 1.52 |

Figure 15:
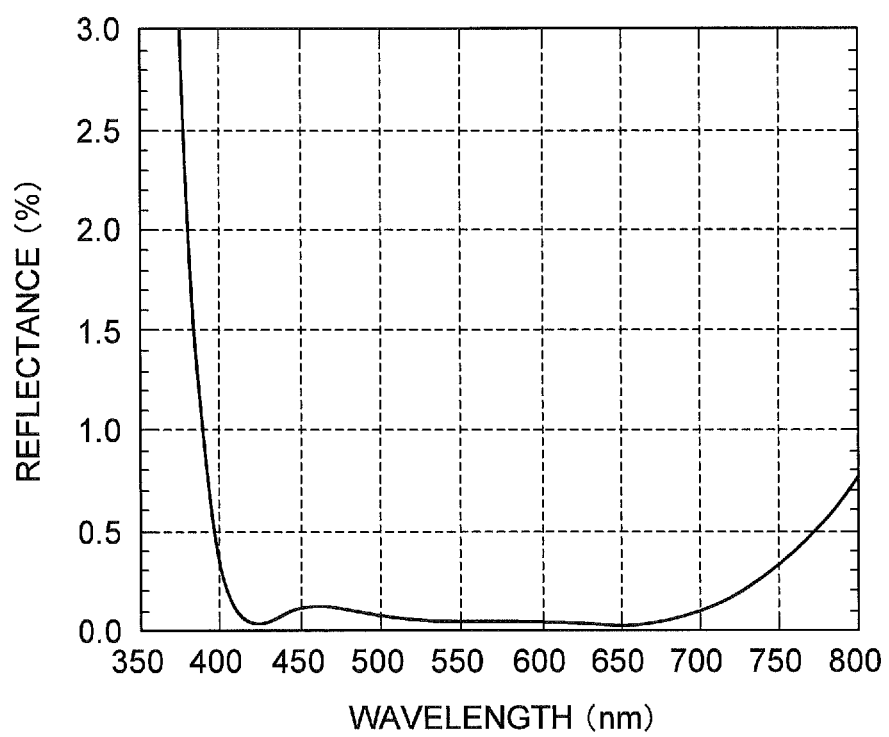
FIG. 15 is a graph showing a spectral characteristic of an antireflection coating according to a modified Example.

FIG. 15 shows the spectral characteristics when the light beams vertically get incident on the optical member formed with the antireflection coating in which the optical film thickness of each of the layers of the antireflection coating is designed, with the refractive index of the substrate being 1.52 and the reference wavelength λ being 550 nm in the Table 5.

It is understood from FIG. 15 that the antireflection coating according to the modified Example can restrain the reflectance down to 0.2% or less over the entire range in which the wavelengths of the light beams are 420 nm through 720 nm. Note that, in the Table 5, even the optical member including the antireflection coating, in which each optical film thickness is designed with the reference wavelength λ set to the d-line (wavelength 587.6 nm), has substantially the same spectral characteristics as shown in FIG. 15 with none of the spectral characteristics being affected.

Figure 16:
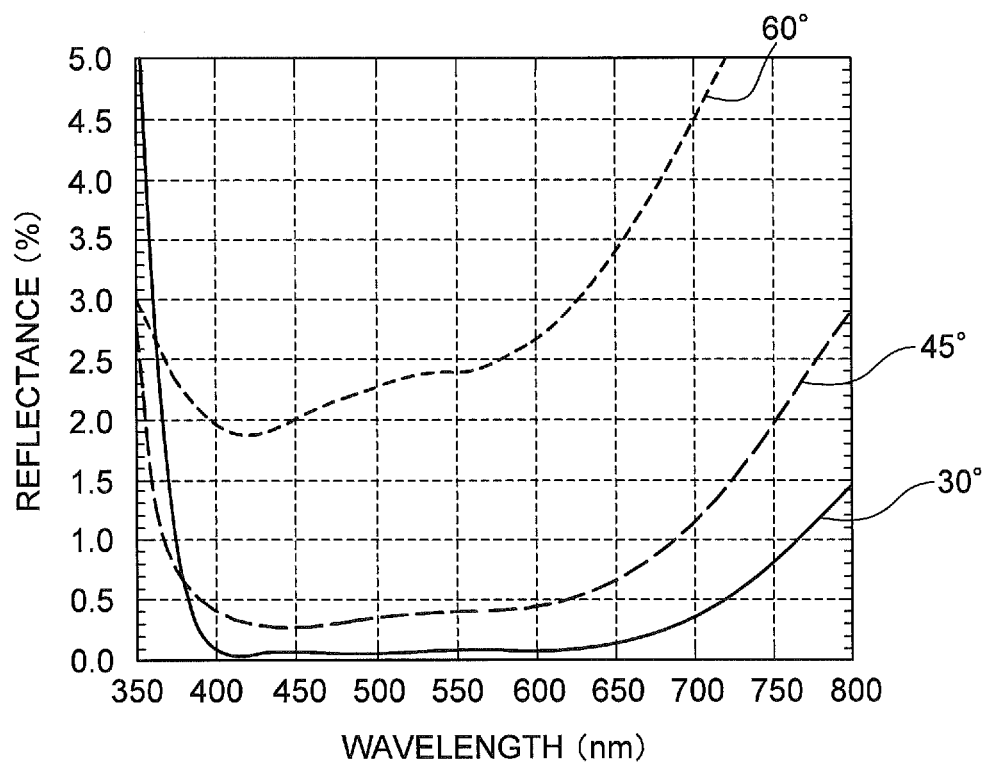
FIG. 16 is a graph showing an incident angle dependency of the spectral characteristic of the antireflection coating according to the modified Example.

FIG. 16 shows the spectral characteristics in such a case that the incident angles of the light beams upon the optical member having the spectral characteristics shown in FIG. 15 are 30 degrees, 45 degrees and 60 degrees, respectively. Note that FIGS. 15 and 16 do not illustrate the spectral characteristics of the optical member including the antireflection coating shown in Table 5 in which the substrate refractive index is 1.46, however, it is understood that the optical member has substantially the same spectral characteristics such as the substrate refractive index being 1.52.

Figure 17:
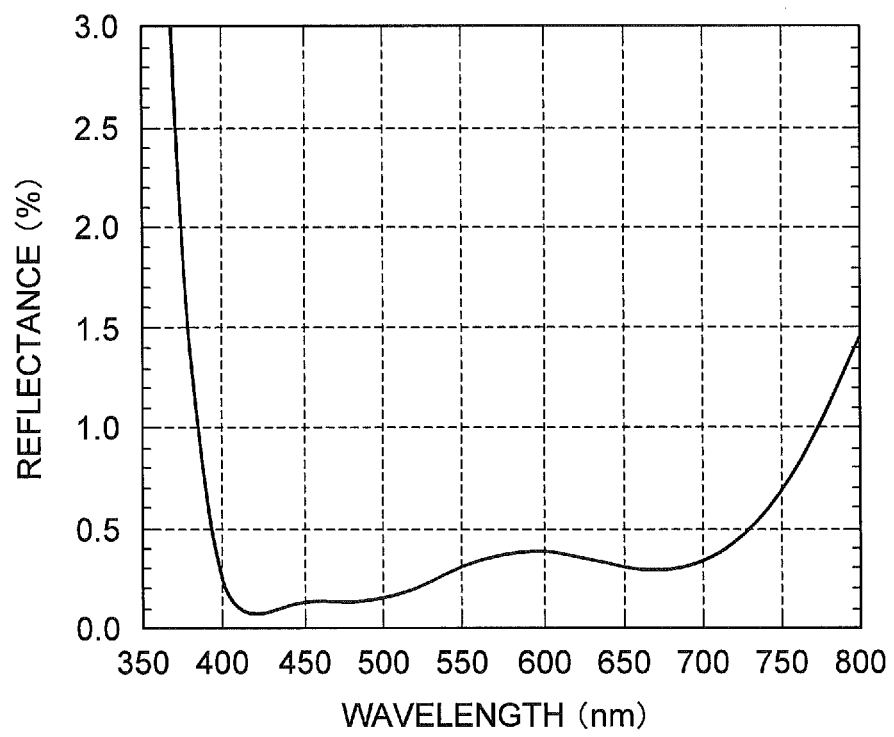
FIG. 17 is a graph showing a spectral characteristic of an antireflection coating produced by a conventional technique.
Figure 18:
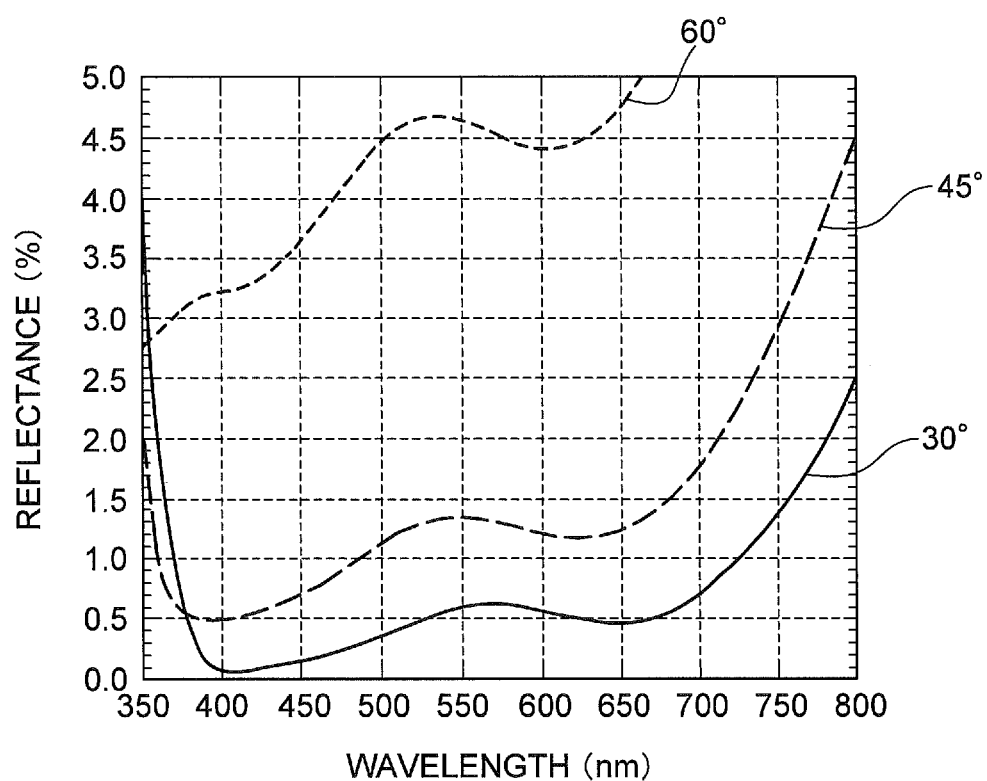
FIG. 18 is a graph showing an incident angle dependency of a spectral characteristic of an antireflection coating produced by a conventional technique.

To compare, an example of antireflection coating formed by a dry process only such as a conventional vacuum vapor deposition method, is shown in FIG. 17. FIG. 17 shows the spectral characteristics when the light beams vertically get incident on the optical member formed with the antireflection coating designed under the conditioned shown in Table 6 below. FIG. 18 shows the spectral characteristics in such a case that the incident angles of the light beams upon the optical member having the spectral characteristics shown in FIG. 17 are 30 degrees, 45 degrees and 60 degrees, respectively.

TABLE 6

|  | material | N | D |
| --- | --- | --- | --- |
| medium | air | 1 | |
| 7$^{th}$ layer | MgF2 | 1.39 | 0.243λ |
| 6$^{th}$ layer | ZrO2 + TiO2 | 2.12 | 0.119λ |
| 5$^{th}$ layer | Al2O3 | 1.65 | 0.057λ |
| 4$^{th}$ layer | ZrO2 + TiO2 | 2.12 | 0.220λ |
| 3$^{rd}$ layer | Al2O3 | 1.65 | 0.064λ |
| 2$^{nd}$ layer | ZrO2 + TiO2 | 2.12 | 0.057λ |
| 1$^{st}$ layer | Al2O3 | 1.65 | 0.193λ |
| refractive index of substrate | | | 1.52 |

The spectral characteristics of the optical member having the antireflection coating of the present application shown in FIG. 14 through FIG. 16 being compared with the spectral characteristics of the conventional examples shown in FIGS. 17 and 18, it is well understood that any of the antireflection coatings of the present application have lower reflectance at any incident angles, and moreover low reflectance over broader band range.

Next, the antireflection coating of the present application (antireflection coating in Table 4) described above and the modified Example thereof (antireflection coating in Table 5) applied to the variable magnification optical systems according to the respective Examples described above will be illustrated.

In the variable magnification optical system according to the First Example, refractive index of the negative meniscus lens L12 of the first lens group G1 is 1.903660 as shown in Table 1, and refractive index of the positive meniscus lens L14 of the first lens group G1 is 1.497820 as shown in Table 1.

Antireflection coating corresponding to the substrate whose refractive index is 1.85 shown in Table 4 is used onto the object side lens surface of the negative meniscus lens L12. Antireflection coating corresponding to the substrate whose refractive index is 1.52 shown in Table 5 is used onto the object side lens surface of the negative meniscus lens L14.

Thus, the variable magnification optical system according to the First Example can reduce light rays reflected by each lens surface applied with antireflection coating so that ghost as well as flare can be effectively reduced.

In the variable magnification optical system according to the Second Example, refractive indices of the positive meniscus lens L14 of the first lens group G1 and of the positive lens L42 of the fourth lens group G4 each is 1.497820 as shown in Table 2, and refractive index of the negative lens L45 of the fourth lens group G4 is 1.714409 as shown in Table 2.

Antireflection coatings corresponding to the substrate whose refractive index is 1.52 shown in Table 5 are used onto both of the image side lens surface of the positive meniscus lens L14 and the object side lens surface of the positive lens L42. Antireflection coating corresponding to the substrate whose refractive index is 1.74 shown in Table 4 is used onto the image side lens surface of the negative lens L45.

Thus, the variable magnification optical system according to the Second Example can reduce light rays reflected by each lens surface applied with antireflection coating so that ghost as well as flare can be effectively reduced.

In the variable magnification optical system according to the Third Example, refractive index of the positive lens L47 of the fourth lens group G4 is 1.589130 as shown in Table 3, and refractive index of the positive lens L48 of the fourth lens group G4 is 1.719995 as shown in Table 3.

Antireflection coating corresponding to the substrate whose refractive index is 1.62 shown in Table 4 is used onto the object side lens surface of the positive lens L47. Antireflection coating corresponding to the substrate whose refractive index is 1.74 shown in Table 4 is used onto the image side lens surface of the negative lens L48.

Thus, the variable magnification optical system according to the Third Example is capable of reducing light rays reflected by each lens surface applied with antireflection coating so that ghost as well as flare can be effectively reduced.

As described above, according to the above respective Examples, it is possible to realize the variable magnification optical systems which can suppress variations in aberrations upon zooming, reduce ghost as well as flare and have superb optical performance from the wide angle end state to the telephoto end state. Particularly, the variable magnification optical system according to each of the Examples, can reduce deterioration in optical performances caused by manufacturing errors. Further, the variable magnification optical system according to each of the Examples, can attain superb optical performance even in the intermediate focal length state.

Note that each of the above described Examples is a concrete example of the invention of the present application, and the invention of the present application is not limited to them. The contents described below can be adopted without deteriorating optical performance of the variable magnification optical systems according to the first to the third embodiments of the present application.

Although the variable magnification optical systems each having a four group configuration were illustrated above as numerical examples of the variable magnification optical systems according to the first to the third embodiments of the present application, the present application is not limited to them and the variable magnification optical systems having other configurations, such as five group configuration and the like, can be configured. Concretely, a lens configuration that a lens or a lens group is added to the most object side thereof is possible, and a lens configuration that a lens or a lens group is added to the most image side thereof is also possible.

Further, in the variable magnification optical systems according to the first to the third embodiments of the present application, in order to vary focusing from an infinitely distance object to a close object, a portion of a lens group, a single lens group in the entirety thereof, or a plurality of lens groups can be moved along the optical axis as a focusing lens group. It is particularly preferable that at least a portion of the first lens group is moved as the focusing lens group. The focusing lens group can be used for auto focus, and suitable for being driven by a motor such as an ultrasonic motor.

Further, in the variable magnification optical systems according to the first to the third embodiments of the present application, any lens group in the entirety thereof or a portion thereof can be shifted in a direction including a component perpendicular to the optical axis as a vibration reduction lens group, or rotationally moved (swayed) in a direction including the optical axis for correcting an image blur caused by a camera shake. Particularly, in the variable magnification optical systems according to the first to the third embodiments of the present application, it is preferable that at least a portion of the fourth lens group is used as a vibration reduction lens group.

Further, in the variable magnification optical systems according to the first to the third embodiments of the present application, a lens surface of a lens may be a spherical surface, a plane surface, or an aspherical surface. When a lens surface is a spherical surface or a plane surface, lens processing, assembling and adjustment become easy, and it is possible to prevent deterioration in optical performance caused by lens processing, assembling and adjustment errors, so that it is preferable. Moreover, even if the image plane is shifted, deterioration in optical performance is little, so that it is preferable. When a lens surface is an aspherical surface, the aspherical surface may be fabricated by a grinding process, a glass molding process that a glass material is formed into an aspherical shape by a mold, or a compound type process that a resin material is formed into an aspherical shape on a glass lens surface. A lens surface may be a diffractive optical surface, and a lens may be a graded-index type lens (GRIN lens) or a plastic lens.

Further, in the variable magnification optical systems according to the first to the third embodiments of the present application, it is preferable that an aperture stop is disposed between the third lens group and the fourth lens group, and the function may be substituted by a lens frame without disposing a member as an aperture stop.

Moreover, the lens surface(s) of the lenses configuring the variable magnification optical systems according to the first to the third embodiments of the present application, may be coated with antireflection coating(s) having a high transmittance in a broad wave range. With this contrivance, it is feasible to reducing a flare as well as ghost and attain the high contrast and the high optical performance.

Next, a camera equipped with the variable magnification optical system according to the first to the third embodiments of the present application, will be explained with referring to FIG. 10.

Figure 10:
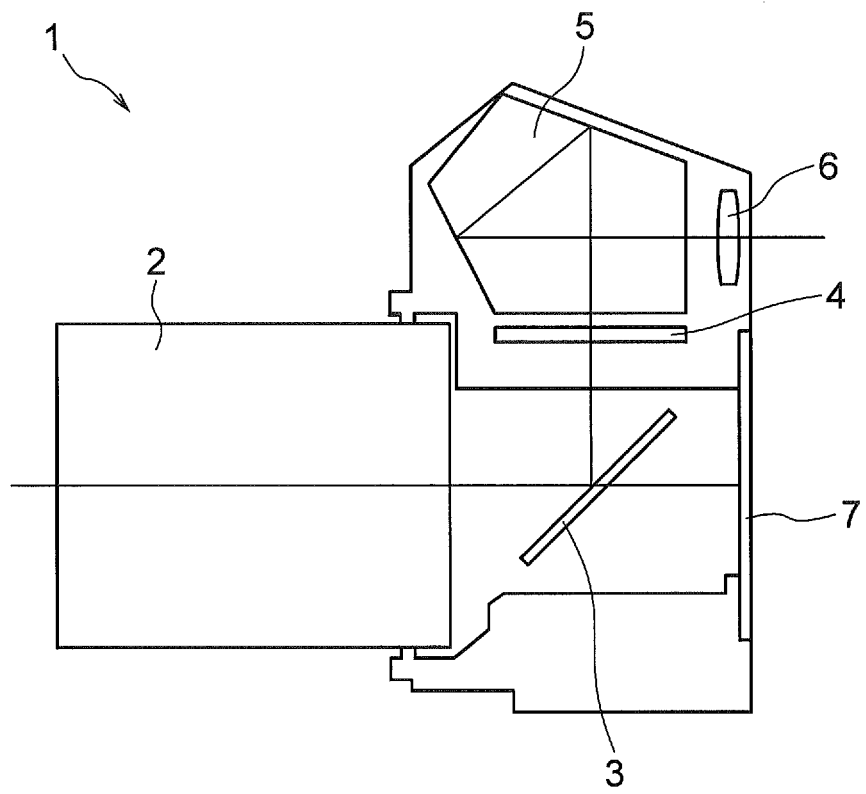
FIG. 10 is a view showing a configuration of a camera equipped with the variable magnification optical system according to the first to third embodiments.

FIG. 10 is a sectional view showing a configuration of a camera equipped with the variable magnification optical system according to the first to the third embodiments of the present application. The present camera 1 is a single-lens reflex digital camera equipped with the variable magnification optical system according to the First Example as an imaging lens 2.

In the present camera 1, light emitted from an unillustrated object is converged by the imaging lens 2, reflected by a quick return mirror 3, and focused on a focusing screen 4. The light focused on the focusing screen 4 is reflected a plurality of times in a pentagonal roof prism 5, and is led to an eyepiece 6. Accordingly, a photographer can observe the object image as an erected image through the eyepiece 6.

When the photographer presses an unillustrated release button down, the quick return mirror 3 is retracted from the optical path, and the light from the unillustrated object forms an object image on an imaging device 7. Accordingly, the light emitted from the object is captured by the imaging device 7, and stored in an unillustrated memory as a photographed image of the object. In this manner, the photographer can take a picture of an object by the camera 1.

The variable magnification optical system according to the First Example installed as the imaging lens 2 in the camera 1, has excellent optical performances from the wide angle end state to the telephoto end state by suppressing variations in aberrations upon zooming as above described, suppressing deterioration in optical performance upon conducting vibration reduction and reducing a ghost as well as flare.

In other words, the present camera 1 can suppress variations in aberrations upon zooming, suppress deterioration in optical performance upon conducting vibration reduction and reduce a ghost as well as flare, and realize excellent optical performances from the wide angle end state to the telephoto end state.

Incidentally, even if a variable magnification optical system according to the Second or the Third Example is installed as an imaging lens 2 in a camera, the same effect as the camera 1 can be obtained.

Further, even if a variable magnification optical system according to each of the First to the Third Examples is installed in a camera, which does not include a quick return mirror 3, the same effect as the above described camera 1 can be obtained.

Figure 11:
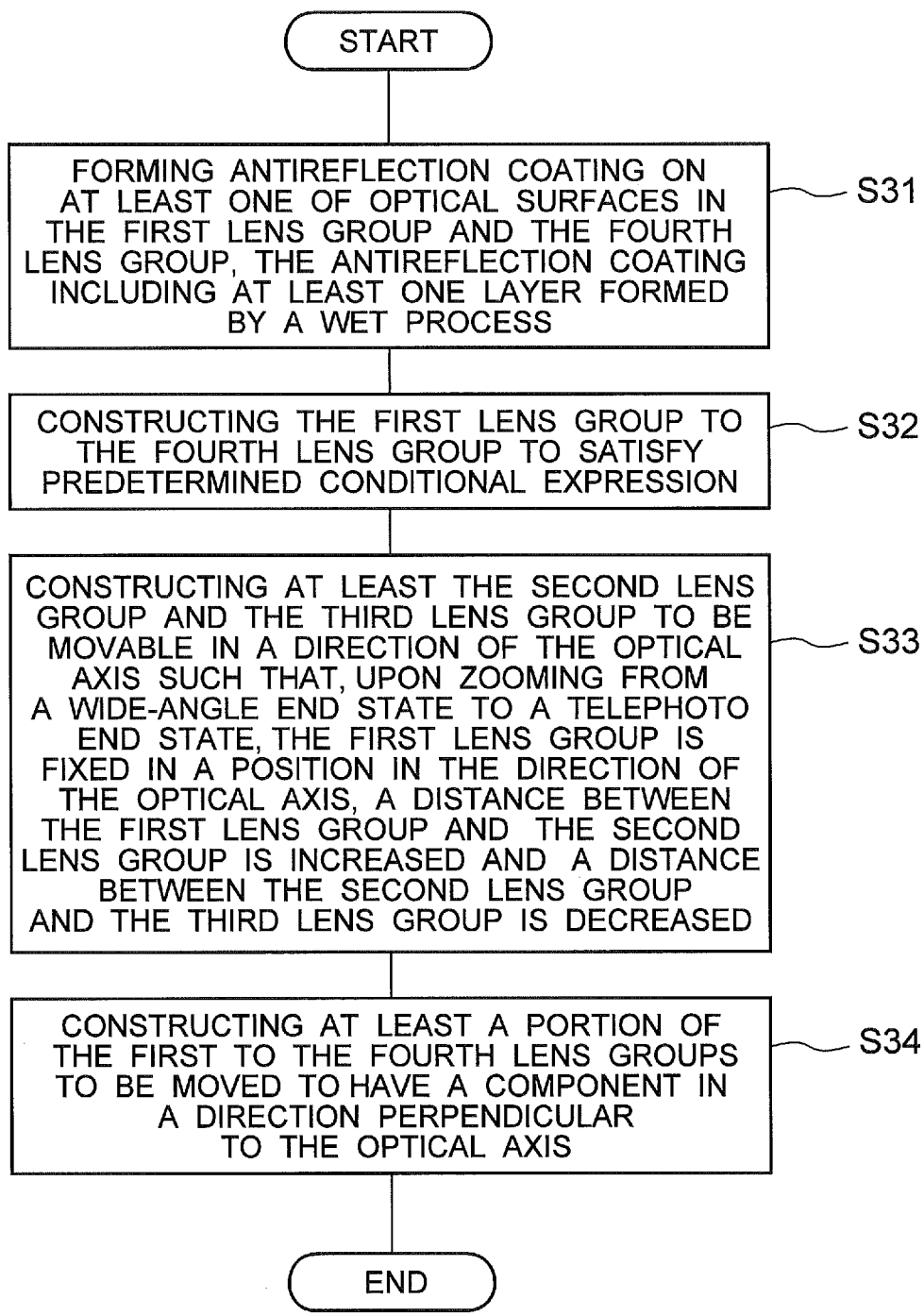
FIG. 11 is a flowchart schematically explaining a method for manufacturing the variable magnification optical system according to the third embodiment of the present application.
Figure 19:
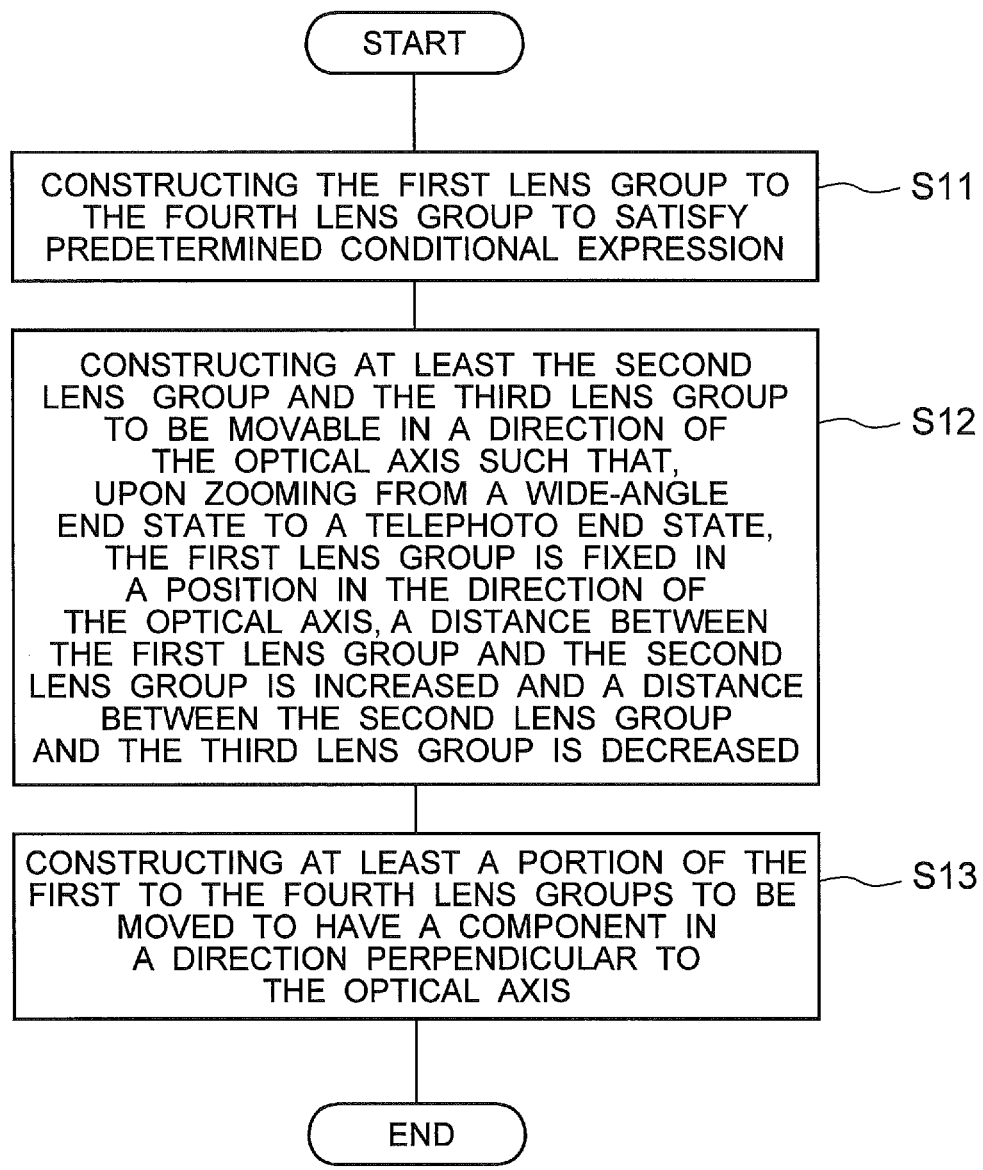
FIG. 19 is a flowchart schematically showing a method for manufacturing the variable magnification optical system according to the first embodiment of the present application.
Figure 20:
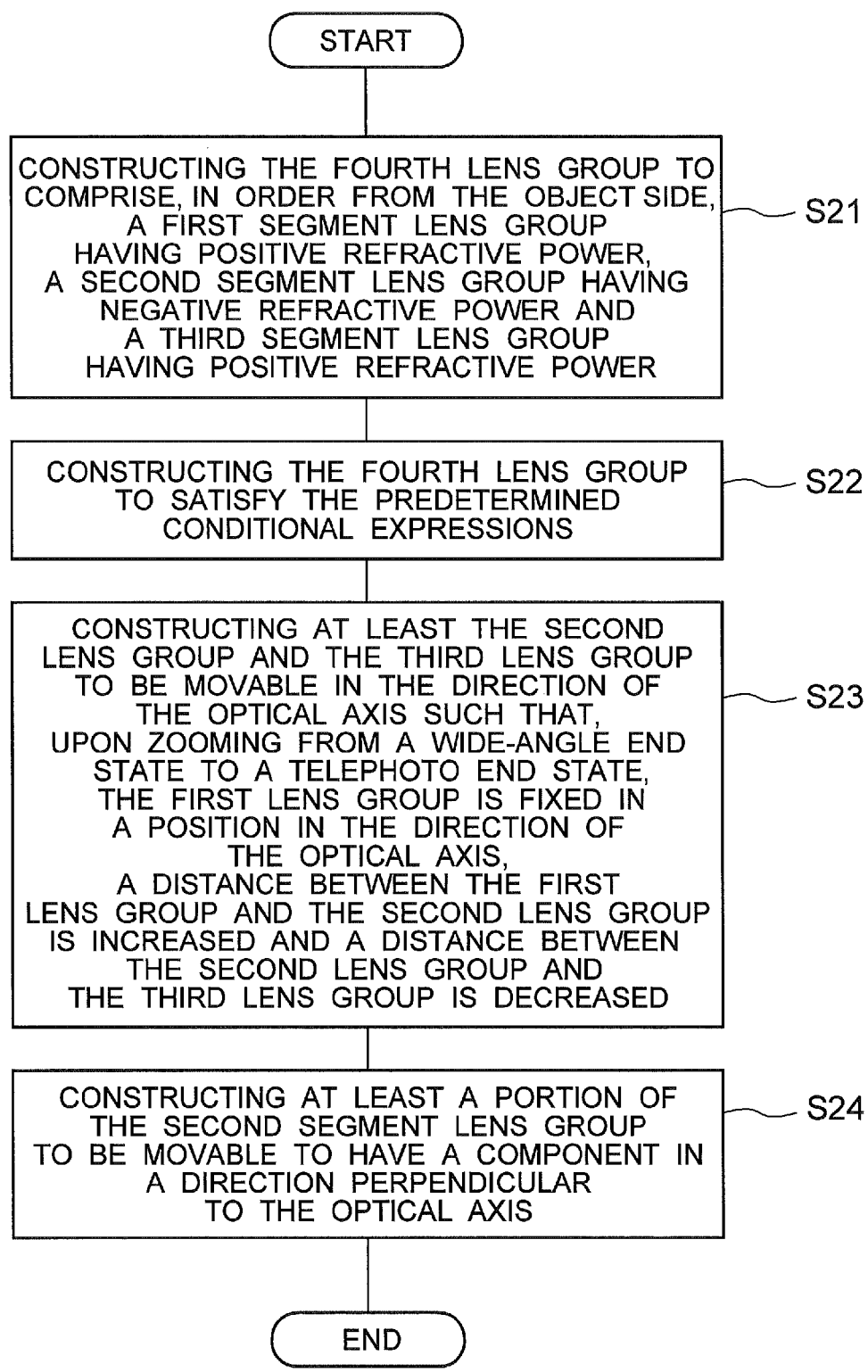
FIG. 20 is a flowchart schematically showing a method for manufacturing the variable magnification optical system according to the second embodiment of the present application.

Finally, an outline of a method for manufacturing a variable magnification optical system according to the first to the third embodiments of the present application, is described with referring to FIGS. 11, 19 and 20.

FIG. 19 is a flowchart showing an outline of a method for manufacturing a variable magnification optical system according to the first embodiment of the present application.

The method for manufacturing the variable magnification optical system according to the first embodiment shown in FIG. 19, is a method for manufacturing a variable magnification optical system, comprising, in order from an object side: a first lens group having positive refractive power; a second lens group having negative refractive power; a third lens group having positive refractive power; and a fourth lens group having positive refractive power; and the method comprises the following steps of S11 to S13:

Step S11: preparing the first lens group to the fourth lens group such that the following conditional expression (1) is satisfied:

$$-1.20 < fw^2/(f13w \times f4) < -0.20 \qquad (1)$$

where f13w denotes a composite focal length of the first lens group to the third lens group in the wide angle end state, f4 denotes a focal length of the fourth lens group, and fw denotes a focal length of the variable magnification optical system in the wide angle end state, and disposing each lens group in order from an object side into a lens barrel.

Step S12: providing a known movement mechanism and constructing at least the second lens group and the third lens group to be movable in a direction of the optical axis such that, upon zooming from a wide-angle end state to a telephoto end state, the first lens group is fixed in a position in the direction of the optical axis, a distance between the first lens group and the second lens group is increased and a distance between the second lens group and the third lens group is decreased.

Step S13: providing a known movement mechanism and constructing at least a portion of the first to the fourth lens groups to be moved to have a component in a direction perpendicular to the optical axis.

Thus, the method for manufacturing a variable magnification optical system according to the first embodiment of the present application makes it possible to manufacture a variable magnification optical system having excellent optical performance from a wide-angle end state to a telephoto end state, with suppressing variations in aberrations upon zooming.

FIG. 20 is a flowchart showing an outline of a method for manufacturing a variable magnification optical system according to the second embodiment of the present application.

The method for manufacturing the variable magnification optical system according to the second embodiment shown in FIG. 20, is a method for manufacturing a variable magnification optical system comprising, in order from an object side: a first lens group having positive refractive power; a second lens group having negative refractive power; a third lens group having positive refractive power; and a fourth lens group having positive refractive power; and the method comprises the following steps of S21 to S24.

Step S21: constructing the fourth lens group to comprise, in order from the object side, a first segment lens group having positive refractive power, a second segment lens group having negative refractive power and a third segment lens group having positive refractive power.

Step S22: preparing the first lens group to the fourth lens group such that the fourth lens group satisfies the following conditional expressions (5) and (6):

$$-1.60 < f4B/f4C < -0.50 \quad (5)$$

$$-1.60 < f4/f4B < -0.60 \quad (6)$$

where f4 denotes a focal length of the fourth lens group, f4B denotes a focal length of the second segment lens group, and f4C denotes a focal length of the third segment lens group, and arranging the respective lens groups in a lens barrel in order from the object side.

Step S23: providing a known movement mechanism and constructing at least the second lens group and the third lens group to be movable in the direction of the optical axis such that, upon zooming from a wide-angle end state to a telephoto end state, the first lens group is fixed in a position in the direction of the optical axis, a distance between the first lens group and the second lens group is increased and a distance between the second lens group and the third lens group is decreased.

Step S24: providing a known movement mechanism and constructing at least a portion of the second segment lens group to be moved to have a component in a direction perpendicular to the optical axis.

Thus, the method for manufacturing a variable magnification optical system according to the second embodiment of the present application makes it possible to manufacture a variable magnification optical system having excellent optical performance from a wide-angle end state to a telephoto end state, with suppressing variations in aberrations upon conducting vibration reduction.

FIG. 11 is a flowchart showing an outline of a method for manufacturing a variable magnification optical system according to the third embodiment of the present application.

The method for manufacturing the variable magnification optical system according to the third embodiment is a method for manufacturing a variable magnification optical system comprising, in order from an object side: a first lens group having positive refractive power; a second lens group having negative refractive power; a third lens group having positive refractive power; and a fourth lens group having positive refractive power; and the method comprises the following steps of S31 to S34.

Step S31: forming an antireflection coating on at least one of optical surfaces in the first lens group and the fourth lens group, the antireflection coating including at least one layer formed by a wet process.

Step S32: preparing the first lens group to the fourth lens group such that the following conditional expression (1) is satisfied:

$$-1.20 < fw^2/(f13w \times f4) < -0.20 \quad (1)$$

where f13w denotes a composite focal length of the first lens group to the third lens group in the wide angle end state, f4 denotes a focal length of the fourth lens group, and fw denotes a focal length of the variable magnification optical system in the wide angle end state, and arranging, in order from the object side, the respective lens groups in a lens barrel.

Step S33: providing a known movement mechanism and constructing at least the second lens group and the third lens group to be movable in a direction of the optical axis such that, upon zooming from a wide-angle end state to a telephoto end state, the first lens group is fixed in a position in the direction of the optical axis, a distance between the first lens group and the second lens group is increased and a distance between the second lens group and the third lens group is decreased.

Step S34: providing a known movement mechanism and constructing at least a portion of the first to the fourth lens groups to be moved to have a component in a direction perpendicular to the optical axis.

Thus, the method for manufacturing a variable magnification optical system according to the third embodiment of the present application makes it possible to manufacture a variable magnification optical system having excellent optical performance from a wide-angle end state to a telephoto end state, with suppressing variations in aberrations upon zooming, and reducing a ghost as well as flare.

What is claimed is:

1. A variable magnification optical system comprising, in order from an object side: a first lens group having positive refractive power; a second lens group having negative refractive power; a third lens group having positive refractive power; and a fourth lens group having positive refractive power;

upon zooming from a wide-angle end state to a telephoto end state, the first lens group being fixed in a position in the direction of the optical axis, and at least the second lens group and the third lens group being moved in the direction of the optical axis such that a distance between the first lens group and the second lens group is increased and a distance between the second lens group and the third lens group is decreased;

at least a portion of the first lens group to the fourth lens group being moved to have a component in a direction perpendicular to the optical axis; and the following conditional expression being satisfied:

$$-1.20 < fw^2/(f13w \times f4) < -0.20$$

where f13$w$ denotes a composite focal length of the first lens group to the third lens group in the wide angle end state, f4 denotes a focal length of the fourth lens group, and fw denotes a focal length of the variable magnification optical system in the wide angle end state, and wherein magnification of the second lens group varies so as to stride across the equi-magnification and the following conditional expression is satisfied:

$$0.50 < \beta 2w \times \beta 2t < 0.90$$

where β2$w$ denotes magnification of the second lens group in the wide angle end state, and β2$t$ denotes magnification of the second lens group in the telephoto end state.

2. The variable magnification optical system according to claim 1, wherein the first lens group is composed of, in order from the object side, a front group having positive refractive power and a rear group having positive refractive power, and
upon focusing from an infinite distance object to a close distance object the rear group is moved toward the object side.

3. The variable magnification optical system according to claim 2, wherein the front group of the first lens group is composed of a single lens having positive refractive power, and the rear group of the first lens group is composed of, in order from the object side, a negative lens, a positive lens and a positive lens.

4. The variable magnification optical system according to claim 1, wherein the most image side lens group in the variable magnification optical system has positive refractive power and is fixed in a position in the direction of the optical axis upon zooming from the wide angle end state to the telephoto end state.

5. The variable magnification optical system according to claim 1, wherein the following conditional expression is satisfied:

$$0.290 < N1n - N1p$$

where N1$n$ denotes refractive index of a negative lens having the largest refractive index in the first lens group, and N1$p$ denotes refractive index of a positive lens having the smallest refractive index in the first lens group.

6. The variable magnification optical system according to claim 1, wherein the following conditional expression is satisfied:

$$0.160 < N3n - N3p$$

where N3$n$ denotes refractive index of a negative lens having the largest refractive index in the third lens group, and N3$p$ denotes refractive index of a positive lens having the smallest refractive index in the third lens group.

7. The variable magnification optical system according to claim 1, wherein the fourth lens group comprises, in order from the object side, a first segment lens group having positive refractive power, a second segment lens group having negative refractive power, and a third segment lens group having positive refractive power, and
at least a portion of the second segment lens group is moved to have a component in a direction perpendicular to the optical axis.

8. The variable magnification optical system according to claim 7, wherein the following conditional expression is satisfied:

$$-1.60 < f4B/f4C < -0.50$$

where f4B denotes a focal length of the second segment lens group, and f4C denotes a focal length of the third segment lens group.

9. The variable magnification optical system according to claim 7, wherein the following conditional expression is satisfied:

$$-1.60 < f4/f4B < -0.60$$

where f4 denotes a focal length of the fourth lens group, and f4B denotes a focal length of the second segment lens group.

10. The variable magnification optical system according to claim 1, wherein the second lens group comprises, in order from the object side, a negative lens, a first negative segment group having negative refractive power, and a second negative segment group having negative refractive power, and
the first negative segment group and the second negative segment group are respectively composed of a positive lens and a negative lens, that is, two lenses in total.

11. The variable magnification optical system according to claim 1, wherein an antireflection coating is formed on at least one of the optical surfaces in the first lens group and the fourth lens group, and
the antireflection coating includes at least one layer formed by a wet process.

12. The variable magnification optical system according to claim 11, wherein the antireflection coating is a multi-layered film, and
the layer formed by the wet process is a outermost surface side layer among the layers composing the multi-layered film.

13. The variable magnification optical system according to claim 11, wherein, assuming that a refractive index with respect to d-line (wavelength λ=587.6 nm) of the layer formed by the wet process is nd, nd is 1.30 or less.

14. The variable magnification optical system according to claim 11, wherein an aperture stop is provided, and
the optical surface provided with the antireflection coating is a concave lens surface viewed from the aperture stop.

15. The variable magnification optical system according to claim 14, wherein the concave lens surface viewed from the aperture stop, is an object side lens surface of a lens in the first lens group.

16. The variable magnification optical system according to claim 14, wherein the concave lens surface viewed from the aperture stop, is an image side lens surface of a lens in the first lens group.

17. The variable magnification optical system according to claim 14, wherein the concave lens surface viewed from the aperture stop, is an image side lens surface of a lens in the fourth lens group.

18. The variable magnification optical system according to claim 11, wherein the optical surface formed with the antireflection coating is a concave lens surface viewed from the image side.

19. The variable magnification optical system according to claim 18, wherein the concave lens surface viewed from the image side is an object side lens surface of a second lens from the object side in the fourth lens group.

20. The variable magnification optical system according to claim 18, wherein the concave lens surface viewed from the image side is an image side lens surface of a fourth lens from the image side in the fourth lens group.

21. The variable magnification optical system according to claim 18, wherein the concave lens surface viewed from the image side is an object side lens surface of a third lens from the image side in the fourth lens group.

22. An optical apparatus equipped with the variable magnification optical system according to claim 1.

23. A variable magnification optical system comprising, in order from an object side: a first lens group having positive refractive power; a second lens group having negative refractive power; a third lens group having positive refractive power; and a fourth lens group having positive refractive power;

upon zooming from a wide-angle end state to a telephoto end state, the first lens group being fixed in a position in the direction of the optical axis, and at least the second lens group and the third lens group being moved in the direction of the optical axis such that a distance between the first lens group and the second lens group is increased and a distance between the second lens group and the third lens group is decreased;

the fourth lens group comprising, in order from the object side, a first segment lens group having positive refractive power, a second segment lens group having negative refractive power and a third segment lens group having positive refractive power, at least a portion of the second segment lens group being moved to have a component in a direction perpendicular to the optical axis; and the following conditional expressions being satisfied:

$$-1.60 < f4B/f4C < -0.50$$

$$-1.60 < f4/f4B < -0.60$$

where f4 denotes a focal length of the fourth lens group, f4B denotes a focal length of the second segment lens group, and f4C denotes a focal length of the third segment lens group and wherein magnification of the second lens group varies so as to stride across the equi-magnification and the following conditional expression is satisfied:

$$0.50 < \beta 2w \times \beta 2t < 0.90$$

where $\beta 2w$ denotes magnification of the second lens group in the wide angle end state, and $\beta 2t$ denotes magnification of the second lens group in the telephoto end state.

24. The variable magnification optical system according to claim 23, wherein the most image side lens group in the variable magnification optical system has positive refractive power and is fixed in a position in the direction of the optical axis upon zooming from the wide angle end state to the telephoto end state.

25. The variable magnification optical system according to claim 23, wherein the following conditional expression is satisfied:

$$0.290 < N1n - N1p$$

where $N1n$ denotes refractive index of a negative lens having the largest refractive index in the first lens group, and $N1p$ denotes refractive index of a positive lens having the smallest refractive index in the first lens group.

26. The variable magnification optical system according to claim 23, wherein the following conditional expression is satisfied:

$$0.160 < N3n - N3p$$

where $N3n$ denotes refractive index of a negative lens having the largest refractive index in the third lens group, and $N3p$ denotes refractive index of a positive lens having the smallest refractive index in the third lens group.

27. The variable magnification optical system according to claim 23, wherein the second lens group comprises, in order from the object side, a negative lens, a first negative segment group having negative refractive power and a second negative segment group having negative refractive power, and the first negative segment group and the second negative segment group are respectively composed of a positive lens and a negative lens, that is, two lenses in total.

28. The variable magnification optical system according to claim 23, wherein the first lens group is composed of, in order from the object side, a front group having positive refractive power and a rear group having positive refractive power, and upon focusing from an infinitely distant object to a close distant object the rear group is moved toward the object side.

29. The variable magnification optical system according to claim 28, wherein the front group of the first lens group is composed of a single lens having positive refractive power, and the rear group of the first lens group is composed of, in order from the object side, a negative lens, a positive lens and a positive lens.

30. An optical apparatus equipped with the variable magnification optical system according to claim 23.

31. A method for manufacturing a variable magnification optical system comprising, in order from an object side: a first lens group having positive refractive power; a second lens group having negative refractive power; a third lens group having positive refractive power; and a fourth lens group having positive refractive power;

the method comprising the steps of:

constructing the first lens group to the fourth lens group to satisfy the following conditional expression:

$$-1.20 < fw^2/(f13w \times f4) < -0.20$$

where $f13w$ denotes a composite focal length of the first lens group to the third lens group in the wide angle end state, $f4$ denotes a focal length of the fourth lens group, and $fw$ denotes a focal length of the variable magnification optical system in the wide angle end state;

constructing at least the second lens group and the third lens group to be moved in a direction of the optical axis such that, upon zooming from a wide-angle end state to a telephoto end state, the first lens group is fixed in a position in the direction of the optical axis, a distance between the first lens group and the second lens group is increased, and a distance between the second lens group and the third lens group is decreased;

constructing at least a portion of the first to the fourth lens groups to be moved to have a component in a direction perpendicular to the optical axis; and constructing such that, upon zooming from the wide angle end state to the telephoto end state, magnification of the second lens group varies so as to stride across the equi-magnification and the following conditional expression is satisfied:

$$0.50 < \beta 2w \times \beta 2t < 0.90$$

where $\beta 2w$ denotes magnification of the second lens group in the wide angle end state, and $\beta 2t$ denotes magnification of the second lens group in the telephoto end state.

32. The method for manufacturing a variable magnification optical system according to claim 31, wherein the first lens group is composed of, in order from the object side, a front group having positive refractive power and a rear group having positive refractive power, and upon focusing from an infinite distance object to a close distance object the rear group is moved toward the object side.

33. The method for manufacturing a variable magnification optical system according to claim 31, wherein the most image side lens group in the variable magnification optical system has positive refractive power and is fixed in a position in the direction of the optical axis, upon zooming from the wide angle end state to the telephoto end state.

34. The method for manufacturing a variable magnification optical system according to claim 31, wherein the fourth lens group is composed of, in order from the object side, a first segment lens group having positive refractive power, a second segment lens group having negative refractive power, and a third segment lens group having positive refractive power, and at least a portion of the second segment lens group is moved to have a component in the direction perpendicular to the optical axis.

35. The method for manufacturing a variable magnification optical system according to claim 34, wherein the following conditional expression is satisfied:

$$-1.60 < f4B/f4C < -0.50$$

where f4B denotes a focal length of the second segment lens group, and f4C denotes a focal length of the third segment lens group.

36. The method for manufacturing a variable magnification optical system according to claim 34, wherein the following conditional expression is satisfied:

$$-1.60 < f4/f4B < -0.60$$

where f4 denotes a focal length of the fourth lens group, and f4B denotes a focal length of the second segment lens group.

37. The method for manufacturing a variable magnification variable magnification optical system according to claim 31, wherein an antireflection coating is formed on at least one of optical surfaces in the first lens group and the fourth lens group, and the antireflection coating includes at least one layer formed by a wet process.

38. The method for manufacturing a variable magnification optical system according to claim 37, wherein the antireflection coating is a multi-layered film, and the layer formed by the wet process is an outermost surface side layer among the layers composing the multi-layered film.

39. The method for manufacturing a variable magnification optical system according to claim 37, wherein, assuming that a refractive index with respect to d-line (wavelength λ=587.6 nm) of the layer formed by the wet process is nd, nd is 1.30 or less.

40. The method for manufacturing a variable magnification optical system according to claim 37, wherein an aperture stop is provided, and the optical surface provided with the antireflection coating is a concave lens surface viewed from the aperture stop.

41. A method for manufacturing a variable magnification optical system comprising, in order from an object side: a first lens group having positive refractive power; a second lens group having negative refractive power; a third lens group having positive refractive power; and a fourth lens group having positive refractive power;

the method comprising the steps of:

constructing the fourth lens group to comprise, in order from the object side, a first segment lens group having positive refractive power, a second segment lens group having negative refractive power and a third segment lens group having positive refractive power;

constructing the fourth lens group to satisfy the following conditional expressions:

$$-1.60 < f4B/f4C < -0.50$$

$$-1.60 < f4/f4B < -0.60$$

where f4 denotes a focal length of the fourth lens group, f4B denotes a focal length of the second segment lens group, and f4C denotes a focal length of the third segment lens group;

constructing at least the second lens group and the third lens group to be movable in the direction of the optical axis such that, upon zooming from a wide-angle end state to a telephoto end state, the first lens group is fixed in a position in the direction of the optical axis, a distance between the first lens group and the second lens group is increased and a distance between the second lens group and the third lens group is decreased;

constructing at least a portion of the second segment lens group to be moved to have a component in a direction perpendicular to the optical axis; and constructing such that magnification of the second lens group varies so as to stride across the equi-magnification and the following conditional expression is satisfied:

$$0.50 < \beta 2w \times \beta 2t < 0.90$$

where $\beta 2w$ denotes magnification of the second lens group in the wide angle end state, and $\beta 2t$ denotes magnification of the second lens group in the telephoto end state.

42. The method for manufacturing a variable magnification optical system according to claim 41, wherein the most image side lens group in the variable magnification optical system has positive refractive power and is fixed in a position in the direction of the optical axis upon zooming from the wide angle end state to the telephoto end state.

* * * * *